US012300215B2

(12) United States Patent
Laitinen et al.

(10) Patent No.: US 12,300,215 B2

(45) Date of Patent: May 13, 2025

(54) SPATIAL AUDIO REPRODUCTION BY POSITIONING AT LEAST PART OF A SOUND FIELD

(71) Applicant: Nokia Technologies Oy, Espoo (FI)

(72) Inventors: Mikko-Ville Laitinen, Espoo (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 71 days.

(21) Appl. No.: 17/978,683

(22) Filed: Nov. 1, 2022

(65) Prior Publication Data

US 2023/0143857 A1 May 11, 2023

(30) Foreign Application Priority Data

Nov. 9, 2021 (GB) ..................................... 2116093

(51) Int. Cl.

*G10K 15/12* (2006.01)
*H04R 3/00* (2006.01)
*H04S 1/00* (2006.01)
*H04S 7/00* (2006.01)

(52) U.S. Cl.

CPC ............. *G10K 15/12* (2013.01); *H04R 3/005* (2013.01); *H04S 1/002* (2013.01); *H04S 7/305* (2013.01); *H04R 2430/21* (2013.01); *H04S 2400/11* (2013.01)

(58) Field of Classification Search

CPC .... G10K 15/12; H04R 3/005; H04R 2430/21; H04S 1/002; H04S 7/305; H04S 2400/11
USPC ........................ 381/92, 300, 1, 310, 307, 26
See application file for complete search history.

(56) References Cited

U.S. PATENT DOCUMENTS

| | | | | |
|---|---|---|---|---|
| 7,099,482 | B1 | 8/2006 | Jot et al. | 381/61 |
| 2008/0037796 | A1 | 2/2008 | Jot et al. | 381/17 |
| 2012/0070020 | A1 * | 3/2012 | Kano | G10K 11/17854 381/386 |
| 2013/0034235 | A1 | 2/2013 | Lee et al. | 381/63 |
| 2016/0134988 | A1 | 5/2016 | Gorzel et al. | |

(Continued)

FOREIGN PATENT DOCUMENTS

| | | | |
|---|---|---|---|
| EP | 3 726 859 | A1 | 10/2020 |
| KR | 20110103094 | A | 9/2011 |

(Continued)

*Primary Examiner* — Thjuan K Addy

(74) *Attorney, Agent, or Firm* — McCarter & English LLP

(57) ABSTRACT

An apparatus including circuitry configured to: obtain at least one audio signal; obtain speaker setup information; obtain, for at least two processing paths, at least one processing path parameter, the at least one processing path parameter including a target direction; process the at least one audio signal to generate a multiple-channel audio signal, generate at least two at least partly mutually incoherent audio signals; determine at least two panning gains; apply each of the at least two panning gains with an associated one of the at least partly mutually incoherent audio signal to generate at least two panning gain applied at least partly mutually incoherent audio signals; and combine the at least two panning gain applied at least partly mutually incoherent audio signals to generate the multiple-channel audio signal; and combine the multiple-channel audio signal from each processing path to generate a combined panning gain applied multiple-channel audio signal.

22 Claims, 16 Drawing Sheets

(56) References Cited

U.S. PATENT DOCUMENTS

| | | | | |
|---|---|---|---|---|
| 2017/0265016 | A1 | 9/2017 | Oh et al. | |
| 2019/0246231 | A1* | 8/2019 | Wardle | H04S 7/304 |
| 2021/0191687 | A1* | 6/2021 | Latina | G06F 3/165 |

FOREIGN PATENT DOCUMENTS

| | | | |
|---|---|---|---|
| WO | WO-2013/108200 | A1 | 7/2013 |
| WO | WO-2019/116890 | A1 | 6/2019 |
| WO | WO-2019175472 | A1 | 9/2019 |
| WO | WO-2020/127329 | A1 | 6/2020 |

* cited by examiner

SPATIAL AUDIO REPRODUCTION BY POSITIONING AT LEAST PART OF A SOUND FIELD

FIELD

The present application relates to apparatus and methods for spatial audio reproduction by positioning at least part of a sound field, but not exclusively for spatial audio reproduction by positioning at least part of a sound field in augmented reality and/or virtual reality apparatus.

BACKGROUND

Reverberation refers to the persistence of sound in a space after the actual sound source has stopped. Different spaces are characterized by different reverberation characteristics. For conveying spatial impression of an environment, reproducing reverberation perceptually accurately is important. Room acoustics are often modelled with individually synthesized early reflection portion and a statistical model for the diffuse late reverberation. FIG. 1 depicts an example of a synthesized room impulse response where the direct sound 101 is followed by discrete early reflections 103 which have a direction of arrival (DOA) and diffuse late reverberation 105 which can be synthesized without any specific direction of arrival. The delay d1(*t*) 102 in FIG. 1 can be seen to denote the direct sound arrival delay from the source to the listener and the delay d2(*t*) 104 can denote the delay from the source to the listener for one of the early reflections (in this case the first arriving reflection).

One method of reproducing reverberation is to utilize a set of N loudspeakers (or virtual loudspeakers reproduced binaurally using a set of head-related transfer functions (HRTF)). The loudspeakers are positioned around the listener somewhat evenly. Mutually incoherent reverberant signals are reproduced from these loudspeakers, producing a perception of surrounding diffuse reverberation.

The reverberation produced by the different loudspeakers has to be mutually incoherent. In a simple case the reverberations can be produced using the different channels of the same reverberator, where the output channels are uncorrelated but otherwise share the same acoustic characteristics such as RT60 time and level (specifically, the diffuse-to-direct ratio or reverberant-to-direct ratio). Such uncorrelated outputs sharing the same acoustic characteristics can be obtained, for example, from the output taps of a Feedback-Delay-Network (FDN) reverberator with suitable tuning of the delay line lengths, or from a reverberator based on using decaying uncorrelated noise sequences by using a different uncorrelated noise sequence in each channel. In this case, the different reverberant signals effectively have the same features, and the reverberation is typically perceived to be similar to all directions.

SUMMARY

There is provided according to a first aspect an apparatus for positioning at least part of a sound field based on a target direction, the apparatus comprising means configured to: obtain at least one audio signal; obtain speaker setup information; obtain, for at least two processing paths, at least one processing path parameter, the at least one processing path parameter comprising a target direction associated with each of the at least two processing paths; process, for each of the at least two processing paths, the at least one audio signal based on the at least one processing path parameter to generate a multiple-channel audio signal, wherein for each processing path the means is configured to: generate at least two at least partly mutually incoherent audio signals from the at least one audio signal; determine at least two panning gains based on the target direction associated with the processing path and the speaker setup information; apply each of the at least two panning gains with an associated one of the at least partly mutually incoherent audio signal to generate at least two panning gain applied at least partly mutually incoherent audio signals; and combine the at least two panning gain applied at least partly mutually incoherent audio signals to generate the multiple-channel audio signal; and combine the multiple-channel audio signal from each processing path to generate a combined panning gain applied multiple-channel audio signal.

The at least one processing path parameter may further comprise at least one reverberation parameter associated with each of the at least two processing paths, wherein the means configured to generate at least two at least partly mutually incoherent audio signals from the at least one audio signal may be configured to reverberate, based on the at least one reverberation parameter, the at least one audio signal to generate each of the at least two at least partly mutually incoherent audio signal.

The means configured to generate at least two at least partly mutually incoherent audio signals from the at least one audio signal may be configured to: decorrelate the at least one audio signal to generate each of the at least two at least partly mutually incoherent audio signals.

The means configured to determine at least two panning gains based on the target direction associated with the processing path and the speaker setup information may be configured to apply vector-base amplitude panning based on the target direction associated with the processing path and directions associated with the speaker setup information.

The means may be further configured to generate an immersive audio signal based on processing the combined panning gain applied multiple-channel audio signal.

The means configured to generate the immersive audio signal based on processing the combined panning gain applied multiple-channel audio signal may be configured to: process, for each channel of the combined panning gain applied multiple-channel audio signal, the combined panning gain applied multiple-channel audio signal based on a head related transfer function associated with a direction for a loudspeaker associated with the channel to generate a channel binaural panning processed audio signal; and combine, for all channels, the channel binaural panning processed audio signal to generate the immersive audio signal.

The means configured to obtain speaker setup information may be configured perform one of: receive speaker setup information; determine speaker setup information; and obtain predetermined or default speaker setup information.

The at least two at least partly mutually incoherent audio signals may be mutually incoherent audio signals.

According to a second aspect there is provided a method for an apparatus for positioning at least part of a sound field based on a target direction, the method comprising: obtaining at least one audio signal; obtaining speaker setup information; obtaining, for at least two processing paths, at least one processing path parameter, the at least one processing path parameter comprising a target direction associated with each of the at least two processing paths; processing, for each of the at least two processing paths, the at least one audio signal based on the at least one processing path parameter to generate a multiple-channel audio signal, wherein for processing comprises: generating at least two at least partly mutually incoherent audio signals from the at least one audio signal; determining at least two panning gains based on the target direction associated with the processing path and the speaker setup information; applying each of the at least two panning gains with an associated one of the at least partly mutually incoherent audio signal to generate at least two panning gain applied at least partly mutually incoherent audio signals; and combining the at least two panning gain applied at least partly mutually incoherent audio signals to generate the multiple-channel audio signal; and combining the multiple-channel audio signal from each processing path to generate a combined panning gain applied multiple-channel audio signal.

The at least one processing path parameter may further comprise at least one reverberation parameter associated with each of the at least two processing paths, wherein generating at least two at least partly mutually incoherent audio signals from the at least one audio signal may comprise reverberating, based on the at least one reverberation parameter, the at least one audio signal to generate each of the at least two at least partly mutually incoherent audio signal.

Generating at least two at least partly mutually incoherent audio signals from the at least one audio signal may comprise decorrelating the at least one audio signal to generate each of the at least two at least partly mutually incoherent audio signals.

Determining at least two panning gains based on the target direction associated with the processing path and the speaker setup information may comprise applying vector-base amplitude panning based on the target direction associated with the processing path and directions associated with the speaker setup information.

The method may comprise generating an immersive audio signal based on processing the combined panning gain applied multiple-channel audio signal.

Generating the immersive audio signal based on processing the combined panning gain applied multiple-channel audio signal may comprise: processing, for each channel of the combined panning gain applied multiple-channel audio signal, the combined panning gain applied multiple-channel audio signal based on a head related transfer function associated with a direction for a loudspeaker associated with the channel to generate a channel binaural panning processed audio signal; and combining, for all channels, the channel binaural panning processed audio signal to generate the immersive audio signal.

Obtaining speaker setup information may comprise one of: receiving speaker setup information; determining speaker setup information; and obtaining predetermined or default speaker setup information.

The at least two at least partly mutually incoherent audio signals may be mutually incoherent audio signals.

According to a third aspect there is provided an apparatus for positioning at least part of a sound field based on a target direction, the apparatus comprising at least one processor and at least one memory including a computer program code, the at least one memory and the computer program code configured to, with the at least one processor, cause the apparatus at least to: obtain speaker setup information; obtain, for at least two processing paths, at least one processing path parameter, the at least one processing path parameter comprising a target direction associated with each of the at least two processing paths; process, for each of the at least two processing paths, the at least one audio signal based on the at least one processing path parameter to generate a multiple-channel audio signal, wherein for each processing path the apparatus is caused to: generate at least two at least partly mutually incoherent audio signals from the at least one audio signal; determine at least two panning gains based on the target direction associated with the processing path and the speaker setup information; apply each of the at least two panning gains with an associated one of the at least partly mutually incoherent audio signal to generate at least two panning gain applied at least partly mutually incoherent audio signals; and combine the at least two panning gain applied at least partly mutually incoherent audio signals to generate the multiple-channel audio signal; and combine the multiple-channel audio signal from each processing path to generate a combined panning gain applied multiple-channel audio signal.

The at least one processing path parameter may further comprise at least one reverberation parameter associated with each of the at least two processing paths, wherein the apparatus caused to generate at least two at least partly mutually incoherent audio signals from the at least one audio signal may be caused to reverberate, based on the at least one reverberation parameter, the at least one audio signal to generate each of the at least two at least partly mutually incoherent audio signal.

The apparatus caused to generate at least two at least partly mutually incoherent audio signals from the at least one audio signal may be caused to: decorrelate the at least one audio signal to generate each of the at least two at least partly mutually incoherent audio signals.

The apparatus caused to determine at least two panning gains based on the target direction associated with the processing path and the speaker setup information may be caused to apply vector-base amplitude panning based on the target direction associated with the processing path and directions associated with the speaker setup information.

The apparatus may be further caused to generate an immersive audio signal based on processing the combined panning gain applied multiple-channel audio signal.

The apparatus caused to generate the immersive audio signal based on processing the combined panning gain applied multiple-channel audio signal may be caused to: process, for each channel of the combined panning gain applied multiple-channel audio signal, the combined panning gain applied multiple-channel audio signal based on a head related transfer function associated with a direction for a loudspeaker associated with the channel to generate a channel binaural panning processed audio signal; and combine, for all channels, the channel binaural panning processed audio signal to generate the immersive audio signal.

The apparatus caused to obtain speaker setup information may be caused to perform one of: receive speaker setup information; determine speaker setup information; and obtain predetermined or default speaker setup information.

The at least two at least partly mutually incoherent audio signals may be mutually incoherent audio signals.

According to a fourth aspect there is provided an apparatus comprising: obtaining circuitry configured to obtain at least one audio signal; obtaining circuitry configured to obtain speaker setup information; obtaining circuitry configured to obtain, for at least two processing paths, at least one processing path parameter, the at least one processing path parameter comprising a target direction associated with each of the at least two processing paths; processing circuitry configured to process, for each of the at least two processing paths, the at least one audio signal based on the at least one processing path parameter to generate a multiple-channel audio signal, wherein for each processing path the processing circuitry is configured to: generate at least two at least partly mutually incoherent audio signals from the at least one audio signal; determine at least two panning gains based on the target direction associated with the processing path and the speaker setup information; apply each of the at least two panning gains with an associated one of the at least partly mutually incoherent audio signal to generate at least two panning gain applied at least partly mutually incoherent audio signals; and combine the at least two panning gain applied at least partly mutually incoherent audio signals to generate the multiple-channel audio signal; and combining circuitry configured to combine the multiple-channel audio signal from each processing path to generate a combined panning gain applied multiple-channel audio signal.

According to a fifth aspect there is provided a computer program comprising instructions [or a computer readable medium comprising program instructions] for causing an apparatus to perform at least the following: obtain speaker setup information; obtain, for at least two processing paths, at least one processing path parameter, the at least one processing path parameter comprising a target direction associated with each of the at least two processing paths; process, for each of the at least two processing paths, the at least one audio signal based on the at least one processing path parameter to generate a multiple-channel audio signal, wherein for each processing path the apparatus is caused to: generate at least two at least partly mutually incoherent audio signals from the at least one audio signal; determine at least two panning gains based on the target direction associated with the processing path and the speaker setup information; apply each of the at least two panning gains with an associated one of the at least partly mutually incoherent audio signal to generate at least two panning gain applied at least partly mutually incoherent audio signals; and combine the at least two panning gain applied at least partly mutually incoherent audio signals to generate the multiple-channel audio signal; and combine the multiple-channel audio signal from each processing path to generate a combined panning gain applied multiple-channel audio signal.

According to a sixth aspect there is provided a non-transitory computer readable medium comprising program instructions for causing an apparatus to perform at least the following: obtain speaker setup information; obtain, for at least two processing paths, at least one processing path parameter, the at least one processing path parameter comprising a target direction associated with each of the at least two processing paths; process, for each of the at least two processing paths, the at least one audio signal based on the at least one processing path parameter to generate a multiple-channel audio signal, wherein for each processing path the apparatus is caused to: generate at least two at least partly mutually incoherent audio signals from the at least one audio signal; determine at least two panning gains based on the target direction associated with the processing path and the speaker setup information; apply each of the at least two panning gains with an associated one of the at least partly mutually incoherent audio signal to generate at least two panning gain applied at least partly mutually incoherent audio signals; and combine the at least two panning gain applied at least partly mutually incoherent audio signals to generate the multiple-channel audio signal; and combine the multiple-channel audio signal from each processing path to generate a combined panning gain applied multiple-channel audio signal.

According to a seventh aspect there is provided an apparatus comprising: means for obtaining speaker setup information; means for obtaining, for at least two processing paths, at least one processing path parameter, the at least one processing path parameter comprising a target direction associated with each of the at least two processing paths; means for processing, for each of the at least two processing paths, the at least one audio signal based on the at least one processing path parameter to generate a multiple-channel audio signal, wherein for each processing path the means for processing comprises: means for generating at least two at least partly mutually incoherent audio signals from the at least one audio signal; means for determining at least two panning gains based on the target direction associated with the processing path and the speaker setup information; means for applying each of the at least two panning gains with an associated one of the at least partly mutually incoherent audio signal to generate at least two panning gain applied at least partly mutually incoherent audio signals; and means for combining the at least two panning gain applied at least partly mutually incoherent audio signals to generate the multiple-channel audio signal; and means for combining the multiple-channel audio signal from each processing path to generate a combined panning gain applied multiple-channel audio signal.

According to an eighth aspect there is provided a computer readable medium comprising program instructions for causing an apparatus to perform at least the following: obtain speaker setup information; obtain, for at least two processing paths, at least one processing path parameter, the at least one processing path parameter comprising a target direction associated with each of the at least two processing paths; process, for each of the at least two processing paths, the at least one audio signal based on the at least one processing path parameter to generate a multiple-channel audio signal, wherein for each processing path the apparatus is caused to: generate at least two at least partly mutually incoherent audio signals from the at least one audio signal; determine at least two panning gains based on the target direction associated with the processing path and the speaker setup information; apply each of the at least two panning gains with an associated one of the at least partly mutually incoherent audio signal to generate at least two panning gain applied at least partly mutually incoherent audio signals; and combine the at least two panning gain applied at least partly mutually incoherent audio signals to generate the multiple-channel audio signal; and combine the multiple-channel audio signal from each processing path to generate a combined panning gain applied multiple-channel audio signal.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
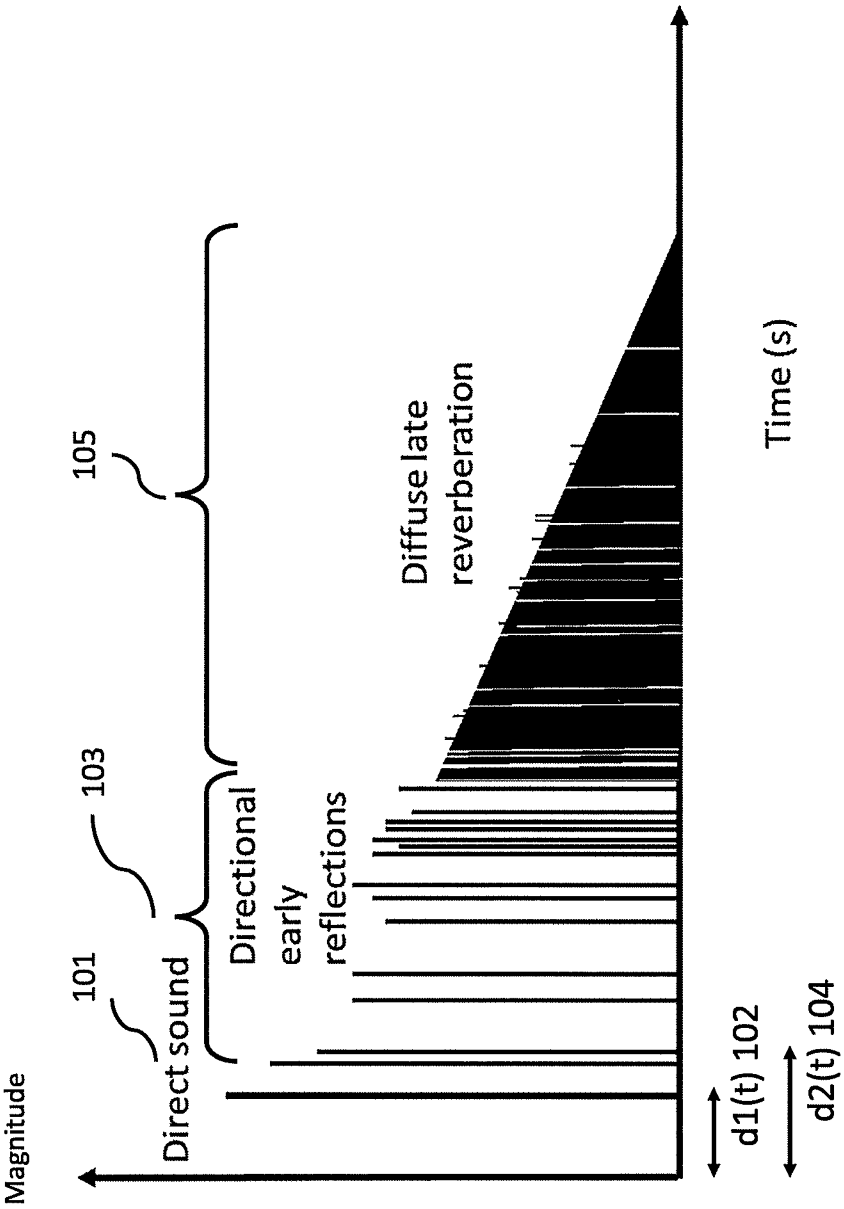
FIG. 1 shows a model of room acoustics and the room impulse response.

The following describes in further detail suitable apparatus and possible mechanisms for parameterizing and rendering audio scenes with reverberation.

As discussed above reproducing reverberation from N incoherent loudspeakers (virtual or real) around the listener often reproduces the perception of diffuse reverberation. However such implementations do not enable the output of suitably perceived reverberation when the reverberation needs to be rotated, such as where the reverberation to be produced is directionally dependent.

This can occur, for example, where the decay rates of different channels are adjusted in a noise-convolution-based reverberator based on the absorption characteristics of different wall materials so that each channel has a different RT60 time.

In an implementation where the reproduction is performed binaurally, i.e., the loudspeakers are virtual loudspeakers created with HRTFs, there is an accurate reproduction where there is no head tracking as the correct reverberation features are perceived from the correct directions. However, problems arise when head tracking is applied.

An example of this can be shown where the listener is first looking forward, and that the reverberation is different in the left-right direction than in the front-back direction. For example, in this situation the RT60 time in the front-back direction is RT60_front_back=1.2 seconds and the reverberation time in the left-right direction is RT60_left_right=0.7 seconds. After the listener rotates their head 90 degrees the listener would assume that the reverberation changes so that the reverberation with RT60=1.2 seconds is now in the left-right direction, whereas the reverberation with RT60=0.7 is now in the front-back direction. However this may not be how the reverberation is implemented.

Although a straightforward alternative would be to always select the closest HRTF to the desired direction of each reverberation channel after applying head tracking, implementing such an approach can cause artefacts during HRTF switching.

Another option can be to interpolate HRTF filters between the desired direction of each reverberation channel after applying head tracking, but in this approach the interpolation steps are likely to cause perceivable artefacts.

An approach to avoid the need to perform HRTF switching or interpolation can be to position the created reverberations based on the head tracking information. For example using the commonly used vector-base amplitude panning (VBAP) methods. As a result, the reverberation that was originally in the front, would be produced from −90 degrees, if the listener rotates their head 90 degrees. As a result, the correct features of the reverberation can be reproduced from the correct directions, according to head tracking information. In this approach, each virtual loudspeaker is spatialized with the same HRTF filter so no artefacts from HRTF filter switching or interpolation would occur.

However, the application of VBAP can causes other problems. VBAP positions an audio signal by reproducing it from 1-3 loudspeakers, according to the loudspeaker setup and the desired direction, and applies suitable gains for each loudspeaker. This is suitable for positioning normal audio signals and has been commonly applied in spatial audio processing. However, reproducing reverberation is problematic as VBAP produces each reverberation signal coherently using the 1-3 loudspeakers. The reverberation produced in such a manner is not perceived to be surrounding and enveloping and diffuse, but instead, perceived to be coherent and non-spacious.

According to some embodiments the concept discussed herein relates to reproduction of diffuse reverberation or ambient audio signals, where a method is proposed that enables the reproduction of rotatable diffuse reverberation or ambience audio where the characteristics of the reverberation or ambience may be directionally dependent (i.e., having different reverberation characteristics in different directions). This in some embodiments is achieved by generating, from one audio signal, two audio signals. These two audio signals are less coherent than just comparing two identical duplicates of the original audio signals. As such, in some embodiments, there is implemented a rendering for a number of processing paths (at least 3, and typically 6-20 paths) (virtual) multichannel signals by determining at least two panning gains based on a target direction and the positions of the (virtual) loudspeakers in a (virtual) loudspeaker set (e.g., using VBAP), obtaining at least partly mutually incoherent audio signals or in other words less coherent audio signals (and preferably mutually incoherent audio signals) for each of the determined gains. For example using outputs of two reverberators tuned to produce the at least partly mutually incoherent (or less coherent or mutually incoherent) reverberant audio signals output, or using decorrelators to produce the at least partly mutually incoherent (less coherent or mutually incoherent) ambient audio signals. The aim of the current examples is one in which the processing paths, each implementing for example a reverberator or decorrelator, produce mutually incoherent audio signals. However due to design and practical considerations the output of each processing path may not produce fully mutually incoherent audio signals but instead produce audio signals which are less coherent or only at least partly mutually incoherent. In the following examples the ideal mutually incoherent audio signals are generated but it would be understood that the production of less coherent audio signals or at least partly mutually incoherent audio signals is also covered by the same methods and apparatus.

Having determined these gains they can be applied for the corresponding obtained (reverberant) signals in order to obtain (reverberant) multichannel signals.

Then having obtained (reverberant) multichannel signals these can be combined in some embodiments to reproduce the combined (reverberant) multichannel signals from the corresponding (virtual) loudspeakers.

In a typical use case, there can be employed a surrounding virtual loudspeaker set (e.g., 16 virtual loudspeakers arranged somewhat evenly around the listener) reproduced with HRTFs. In such a case, the embodiments can be configured to:

- determine initial target directions for reverberators (e.g., the directions of the virtual loudspeakers, i.e., 16 target directions in this example);
- determine three mutually incoherent variants (or less coherent) of a reverberation for each target direction, the reverberation following the desired reverberation characteristics of that direction;
- determine rotated target directions based on the head orientation and the initial target directions; and
- reproduce each three-reverberation set to the corresponding rotated target direction using the present invention (e.g., using VBAP as the panning-gain determination tool).

The resulting sound scene generated by the embodiments can be perceived as surrounding, enveloping, and diffuse. Moreover, the reverberation is updated based on the listener orientation, and thus the features of the reverberation are perceived to originate from the correct directions.

Figure 2:
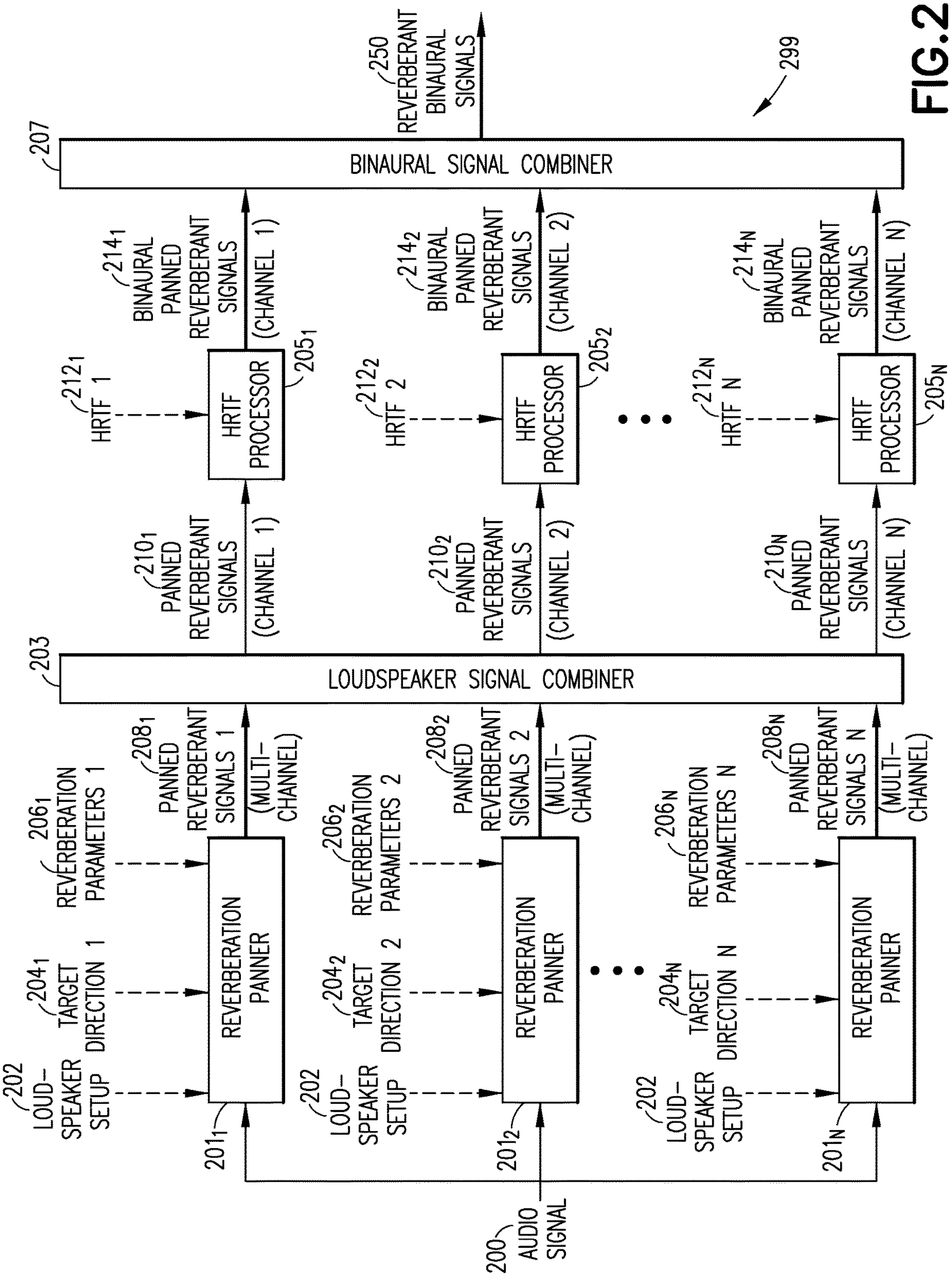
FIG. 2 shows schematically an example apparatus within which some embodiments may be implemented.

With respect to FIG. 2 is shown an example apparatus 299 embodiment utilizing the present invention. The input to the system is an audio signal 200 that is to be reverberated.

The reverberation apparatus shown in FIG. 2 shows a number N of reverberation panners 201. In the FIG. 2 is shown specifically the first reverberation panner 201$_1$ the second reverberation panner 201$_2$ and the N'th reverberation panner 201$_N$. Each reverberation panner 201 is configured to obtain or receive the audio signal 200 and furthermore loudspeaker setup information 202, target direction information 204 and reverberation parameters 206. For example, the first reverberation panner 201$_1$ is configured to obtain or receive the audio signal 200 and loudspeaker setup information 202 and also a first target direction information (or target direction 1) 204$_1$ and a first reverberation parameters (or reverberation parameters 1) 206$_1$. The second reverberation panner 201$_2$ is configured to obtain or receive the common audio signal 200 and loudspeaker setup information 202 and also a second target direction information (or target direction 2) 204$_2$ and a second reverberation parameters (or reverberation parameters 2) 206$_2$. Furthermore the N'th reverberation panner 201$_N$ is configured to obtain or receive the audio signal 200 and loudspeaker setup information 202 and also a N'th target direction information (or target direction N) 204$_N$ and a N'th reverberation parameters (or reverberation parameters N) 206$_N$.

The reverberation is performed according to reverberation parameters and target directions. The input Audio signal can be represented as $s_{in}(n)$ (where n is the temporal sample index). The loudspeaker setup information 202 in some embodiments is a surrounding loudspeaker setup that can be used for creating a perception of enveloping diffuse reverberation. The setup or loudspeaker configuration can be obtained based on any suitable method. For example in some embodiments the loudspeaker setup is a predetermined or default loudspeaker setup information. In some embodiments the loudspeaker setup information is determined (for example a speaker calibration process is implemented), or input (for example by a user input). Furthermore the setup or loudspeaker configuration can be in any suitable format. The loudspeaker setup information can in some embodiments define the number of loudspeakers and the directions relative to the listener. Example setup or configurations of the loudspeakers are described, for example, in the documents K. Hiyama, S. Komiyama, and K. Hamasaki, The Minimum Number of Loudspeakers and Its Arrangement for Reproducing the Spatial Impression of Diffuse Sound Field, AES 113th Convention, 2002 and C. Kirch, J Poppitz, T. Wendt, S. van der Par, and S. Ewert, Spatial Resolution of Late Reverberation in Virtual Acoustic Environments. Submitted to Trends in Hearing (currently available in the Carl von Ossietzky Universitat Oldenburg website), 2021.

An example loudspeaker configuration or setup with 16 speakers which are arranged in three layers, a first layer of 8 speakers in the plane of the listener with 45 degree azimuth separation, a second layer of 4 speakers at 30 degree elevation with 90 degree azimuth separation, and a third layer of 4 speakers at −30 degree elevation with 90 degree azimuth separation. This can be represented by the azimuth and elevation values:

Azimuth $\theta_{ls}(i)$: 0, 45, 90, 135, 180, −135, −90, −45, 45, 135, −135, −45, 45, 135, −135, −45 degrees.

Elevation $\phi_{ls}(i)$: 0, 0, 0, 0, 0, 0, 0, 0, 30, 30, 30, 30, −30, −30, −30, −30 degrees.

where i is the loudspeaker channel. There are N channels in the loudspeaker setup (16 channels in this example).

The reverberation parameters 206 for each of the reverberation panners (such as the first reverberation parameters 206$_1$, second reverberation parameters 206$_2$, and third reverberation parameters 206$_3$) comprises parameters that control the generation of the reverberation in the target direction 1 204$_1$ ($\theta_{target}(1,n)$, $\phi_{target}(1,n)$), target direction 2 204$_2$ ($\theta_{target}(2,n)$, $\theta_{target}(2,n)$) and target direction 3 204$_3$ ($\theta_{target}(3,n)$ $\phi_{target}(3,n)$) respectively (the target directions may change over time). The reverberation parameters and the target directions can be obtained by any suitable method or means. For example, in some embodiments, initial target directions can be set to the directions of the loudspeaker setup, i.e., $$\theta_{initial}(j)=\theta_{ls}(i)$$

$$\phi_{initial}(j)=\phi_{ls}(i)$$

where j is the index of the reverberation panner. Then, the target directions $\theta_{target}(j,n)$, $\phi_{target}(j,n)$ can be determined based on the listener orientation and the initial target directions $\theta_{initial}(j)$, $\phi_{initial}(j)$, e.g., using the quaternions or the method presented in M. V. Laitinen, "Binaural reproduction for directional audio coding", M. Sc. Thesis, T K K, 2008.

The reverberation panner thus is configured to rotate the initial target directions based on the head orientation (available as quaternions or Euler angles).

In some embodiments the reverberation parameters 206 (such as the first reverberation parameters $\mathbf{206}_1$, second reverberation parameters $\mathbf{206}_2$, and third reverberation parameters $\mathbf{206}_3$) can be obtained as an input, for example, from an encoder input format file created by a content creator and contain, in addition to the target directions, parameters such as desired reverberation times RT60(f), reverberant-to-direct ratios RDR(f) (or other equivalent representation such as direct-to-total emitted energy ratios), and/or dimensions and/or one or more materials of a virtual environment.

In some embodiments the first reverberation panner $\mathbf{201}_1$, the second reverberation panner $\mathbf{201}_2$ and the N'th reverberation panner $\mathbf{201}_N$ are then configured, based on the reverberation parameters, to configure or initialize a reverberator which creates reverberated audio signals having the desired reverberation characteristics defined by the reverberation parameters 206 (such as the first reverberation parameters $\mathbf{206}_1$, second reverberation parameters $\mathbf{206}_2$, and third reverberation parameters $\mathbf{206}_3$).

In such embodiments the reverberation panners 201 reverberate the audio signal 201 $s_{in}(n)$ based on the reverberation parameters 206 and generates multichannel signals according to the loudspeaker setup 202 (or loudspeaker configuration), where the reverberated signal is positioned in the target direction 204.

The output of the reverberation panners 201 are respective panned reverberant signals 208 $s_{pr,1}(n,i)$. The first reverberation panner $\mathbf{201}_1$ is configured to generate first panned reverberant signals (or reverberant signals 1) $\mathbf{208}_1$, the second reverberation panner $\mathbf{201}_2$ is configured to generate second panned reverberant signals (or reverberant signals 2) $\mathbf{208}_2$ and the N'th reverberation panner $\mathbf{201}_N$ is configured to generate N'th panned reverberant signals (or reverberant signals N) 208N. The panned reverberant signal 208 $s_{pr,1}(n,i)$ is a multichannel signal with N channels. An example reverberation panner is further described below with respect to FIG. 4.

Thus as shown in FIG. 2 the audio signal 200 $s_{in}(n)$ is forwarded to reverberation panner blocks. These operate identically but for the target direction $\theta_{target}(j,n)$, $\phi_{target}(j,n)$ and the reverberation parameters which are individual for each of the reverberation panner blocks. Moreover, the reverberation produced by the different reverberation panner blocks are mutually incoherent. The output of each reverberation panner block is thus a panned reverberant signals $s_{pr,j}(n,i)$ (where j is the index of the reverberation panner path).

In this example, there are equally many reverberation panners j as there are channels i in the multichannel setup. In other embodiments, there could be a different number of panners.

The apparatus 299 furthermore comprises a loudspeaker signal combiner 203. The loudspeaker signal combiner 203 is configured to receive the panned reverberant signals $s_{pr,j}(n,i)$ 208 and is configured to combine them into a single multichannel signal, the panned reverberant signals 210. For example by applying the following:

$$s_{pr}(n,i) = \sum_j s_{pr,j}(n,i)$$

The resulting panned reverberant signals 210 are forwarded to HRTF processor 205, where each channel i of the panned reverberant signals $\mathbf{210}_1$ is passed to an individual HRTF processor $\mathbf{205}_1$.

Thus for example a first channel of panned reverberant signals $\mathbf{210}_1$ $s_{pr}(n,1)$ is forwarded to a first HRTF processor $\mathbf{205}_1$, which also receives a head-related transfer function "HRTF 1" pair (one filter for each ear) $h_{hrtf}(n,1,k)$ (where k is the HRTF channel, i.e., left, or right) $\mathbf{212}_1$. The direction of the HRTF pair corresponds to the direction of the corresponding channel in the loudspeaker setup $\theta_{ls}(1)$, $\phi_{ls}(1)$. Thus for the example loudspeaker setup or configuration described earlier this would be 0 degrees of azimuth and 0 degrees of elevation. In these embodiments the HRTF processor 205 is configured to apply the HRTF filter (e.g., via convolution), and the resulting signals are binaural panned reverberant signals $s_{pr,bin}(n,1,k)$ 214. Thus the first channel output is the first channel or channel 1 binaural panned reverberant signals $\mathbf{214}_1$ which is passed to a binaural signal combiner 207.

The same processing is applied for each channel of the panned reverberant signals $s_{pr}(n,i)$, using corresponding HRTF filters $h_{hrtf}(n,i,k)$ for each channel. The resulting binaural panned reverberant signals $s_{pr,bin}(n,i,k)$ are forwarded to the binaural signal combiner 207.

In some embodiments the apparatus 299 comprises a binaural combiner 207 which is configured to receive the binaural panned reverberant signals and combines them into a single binaural signal, for example by applying the following:

$$s_{rev,bin}(n,k) = \sum_i s_{pr,bin}(n,i,k)$$

The reverberant binaural signals $s_{rev,bin}(n,k)$ 250 are the output of the processing. The reverberant binaural signals 250 are configured to produce the perception of surrounding diffuse reverberation. Moreover, the reverberation characteristics are rendered based on the desired directional reverberation characteristics, and these characteristics are applied based on the head tracking data or any other directional target data.

Figure 3:
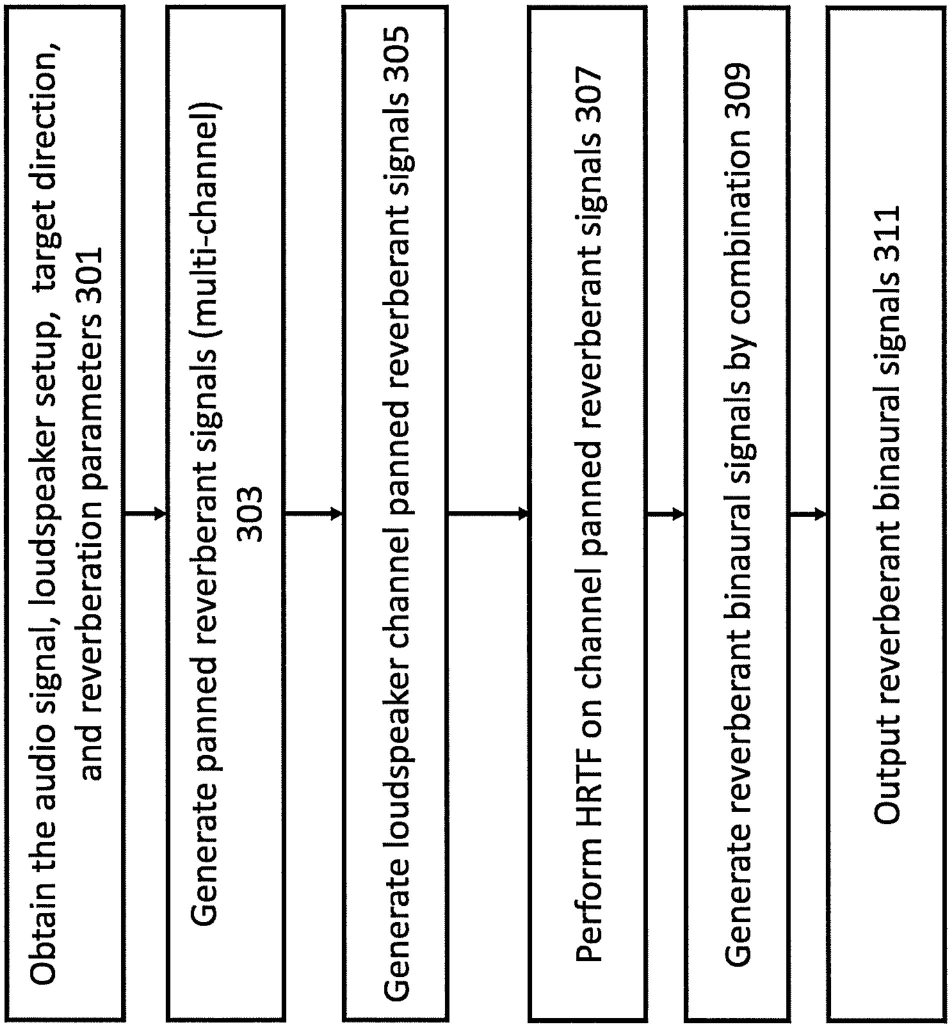
FIG. 3 shows a flow diagram of the operation of the example apparatus as shown in FIG. 2.

With respect to FIG. 3 is shown a flow diagram showing the example operations of the apparatus 299 of FIG. 2.

Thus the method comprises obtaining the audio signal, loudspeaker setup, target direction, and reverberation parameters as shown in FIG. 3 by step 301.

Then having obtained the audio signal, loudspeaker setup, target direction, and reverberation parameters then generate panned reverberant signals (multi-channel) for a multiple of pathways as shown in FIG. 3 by step 303.

The panned reverberant signals can then be combined to generate loudspeaker channel panned reverberant signals as shown in FIG. 3 by step 305.

Then HRTF processing is performed on channel panned reverberant signals as shown in FIG. 3 by step 307.

The processed signals can then be combined to generate reverberant binaural signals as shown in FIG. 3 by step 309.

The reverberant binaural signals can then be output as shown in FIG. 3 by step 311.

Figure 4:
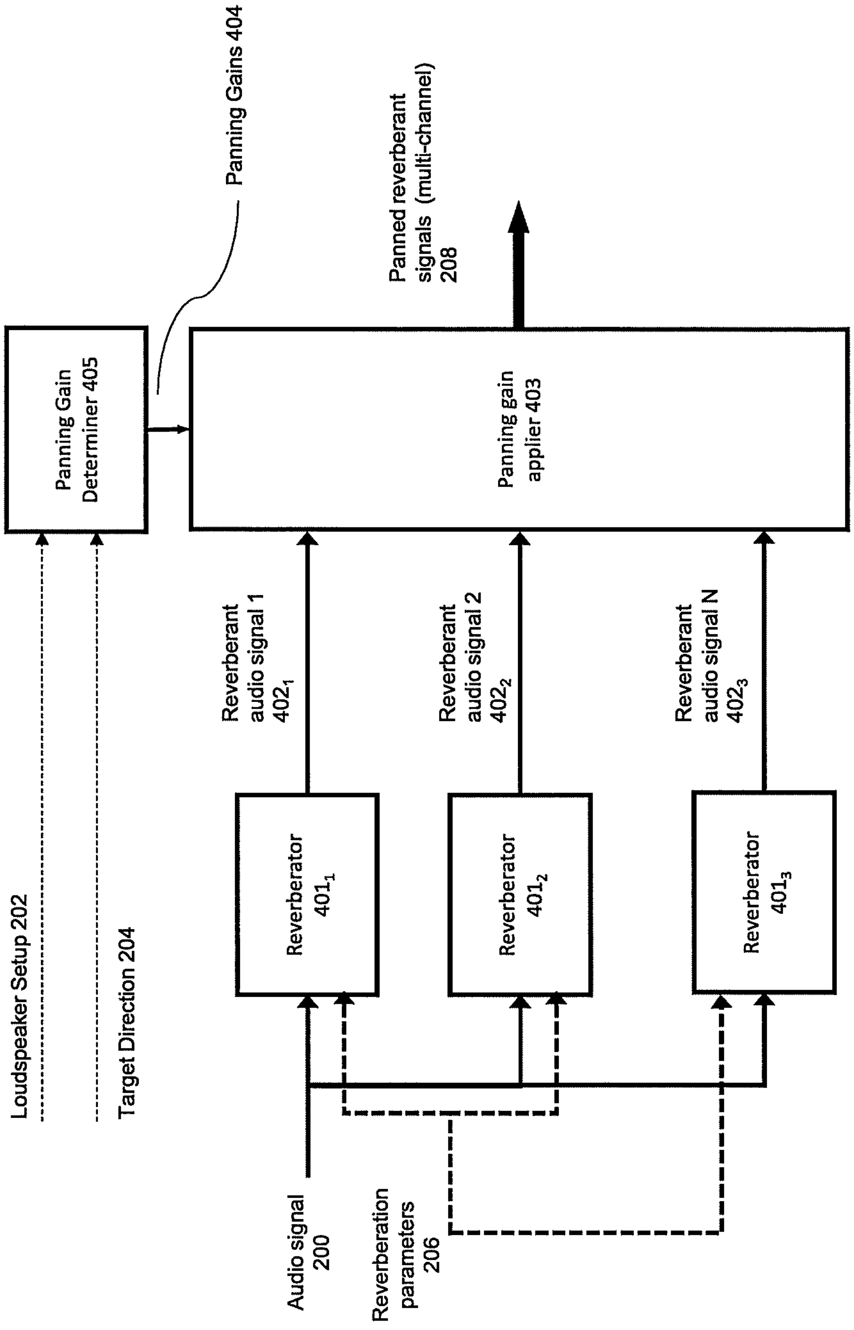
FIG. 4 shows schematically an example reverberation panner as shown in FIG. 2 according to some embodiments.

With respect to FIG. 4, there is schematically shown the reverberation panner 201 in further detail. The example shown in FIG. 4 is one of the N blocks from the example embodiment shown in FIG. 2, and each of them is configured to have individual target direction 204 and reverberation parameter inputs 206. Furthermore in the example shown in FIG. 1 all the reverberation panners of different paths j of are configured to produce mutually incoherent reverberation. Otherwise, the operation of the reverberation panner of the different paths are identical.

In the example shown in FIG. 4 the audio signal $s_{in}(n)$ 200 is passed to a series of reverberators 401 (which are shown as the first reverberator $\mathbf{401}_1$, the second reverberator $\mathbf{401}_2$, and the third reverberator $\mathbf{401}_3$). Each reverberator 401 is configured to also receive the reverberation parameters 206 as an input.

Based on the reverberation parameters 206, the reverberator 401 is configured to produce a reverberated audio signal 402. For example the first reverberator $\mathbf{401}_1$ is configured to output a (first) reverberation audio signal 1 $\mathbf{402}_1$ $s_{rev}(n,1)$, for example, using a feedforward-delay-network (FDN) reverberator.

The second reverberator $\mathbf{401}_2$ is configured to output a (second) reverberated audio signal 1 $\mathbf{402}_2$ $s_{rev}(n,2)$ and the third reverberator $\mathbf{401}_3$ a (third) reverberated audio signal 3 $\mathbf{402}_3$ $s_{rev}(n,3)$. These three signals have the same reverberation characteristics, but they are mutually incoherent.

The loudspeaker setup 202 $\theta_{ls}(i)$, $\phi_{ls}(i)$ and target direction 204 $\theta_{target}(j,n)$, $\phi_{target}(j,n)$ are also an input to the reverberation panner 201 and are forwarded to a panning gain determiner 405 configured to determine panning gains g(i,j,n). These panning gains can be determined using vector base amplitude panning (VBAP), for example based on the methods shown in V. Pulkki, "Virtual source positioning using vector base amplitude panning," J. Audio Eng. Soc., vol. 45, pp. 456-466, June 1997 and EP application 18161580.8. In such embodiments each path j has dedicated panning gains for $\theta_{target}(j,n)$, $\theta_{target}(j,n)$. each channel i, based on the (time-variant) target directions $\theta_{target}(j,n)$, $\phi_{target}(j,n)$. For simplicity, we consider only one time instant and only one path in the following, so we denote the panning gains 404 as g(i) in the following.

The panning gains 404 g(i) are forwarded to a panning gain applier 403. The panning gain applier 403 is configured to receive the panning gains 404 and the reverberated audio signals 402 $s_{rev}(n,l)$ (where l is the reverberator path).

In some embodiments as the panning gains 404 g(i) were created with VBAP, only 1-3 of them are non-zero. In the following example it is assumed that there are exactly three channels with non-zero gains at a first time instant (channels $i_1$, $i_2$, $i_3$), and the rest of the channels have zero gains. In the following example the non-zero channels are 3, 4, and 10.

For the first time instant, these can be assigned in any order, e.g., $i_1$=3, $i_2$=4, $i_3$=10). Then, the reverberated audio signals 402 $s_{rev}(n,l)$ are assigned to these channels, respectively, and processed with the respective gains. For example $$s_{pr,1}(n,3)=s_{rev}(n,1)g(3)$$

$$s_{pr,1}(n,4)=s_{rev}(n,2)g(4)$$

$$s_{pr,1}(n,10)=s_{rev}(n,3)g(10)$$

The rest of the channels are set to zero, $$s_{pr,1}(n,i)=0, i\neq 3,4,10$$

The panned reverberant signals 208 $s_{pr,1}(n,i)$ can then be output.

In this example, for a next time instant, the $\theta_{target}(j,n)$, $\phi_{target}(j,n)$ changes, and the panning gains 404 g(i) also change. However, the non-zero gains are still in the same channels, i.e., 3, 4, and 10 as an example. In this example, the assignment of the reverberant signals to the non-zero channels cannot be freely selected. Instead, the assignment order remains the same, i.e., $i_1$=3, $i_2$=4, $i_3$=10. This ensures that there are no discontinuities in the output signals $s_{pr,1}(n,i)$, and good audio quality is maintained. If the assignment would be changed, there would be a discontinuity in the audio signals, and potentially clicks or snaps in the audio signal would be produced.

Then for a next time instant the $\theta_{target}(j,n)$, $\phi_{target}(j,n)$ changes once again, and the panning gains 404 g(i) also change. This time, it is assumed that the non-zero gains are in different channels, e.g., 3, 4, and 14. Also in this example, the assignment of the reverberant signals to non-zero channels cannot be freely selected. Channels 3 and 4 need to keep their respective reverberant signals in order to avoid any discontinuities (and subsequent clicks and snaps). However, the third reverberant signal can be changed to the new channel. Thus, the new assignment is $i_1$=3, $i_2$=4, $i_3$=14. The output thus is $$s_{pr,1}(n,3)=s_{rev}(n,1)g(3)$$

$$s_{pr,1}(n,4)=s_{rev}(n,2)g(4)$$

$$s_{pr,1}(n,14)=s_{re}(n,3)g(14)$$

$$s_{pr,1}(n,i)=0, i\neq 3,4,14$$

Thus, the selection of the loudspeaker channel for each reverberated signal is performed in a way that the channel is changed only via "zero gain". In other words for the channels having gains larger than zero, the same reverberation is kept. Furthermore, when the value of a certain panning gain 404 goes to zero and another channel is assigned a gain value larger than zero, the change of the reverberated signal channel mapping is performed. When using VBAP as the panning tool, this change, moreover, happens smoothly.

Figure 5:
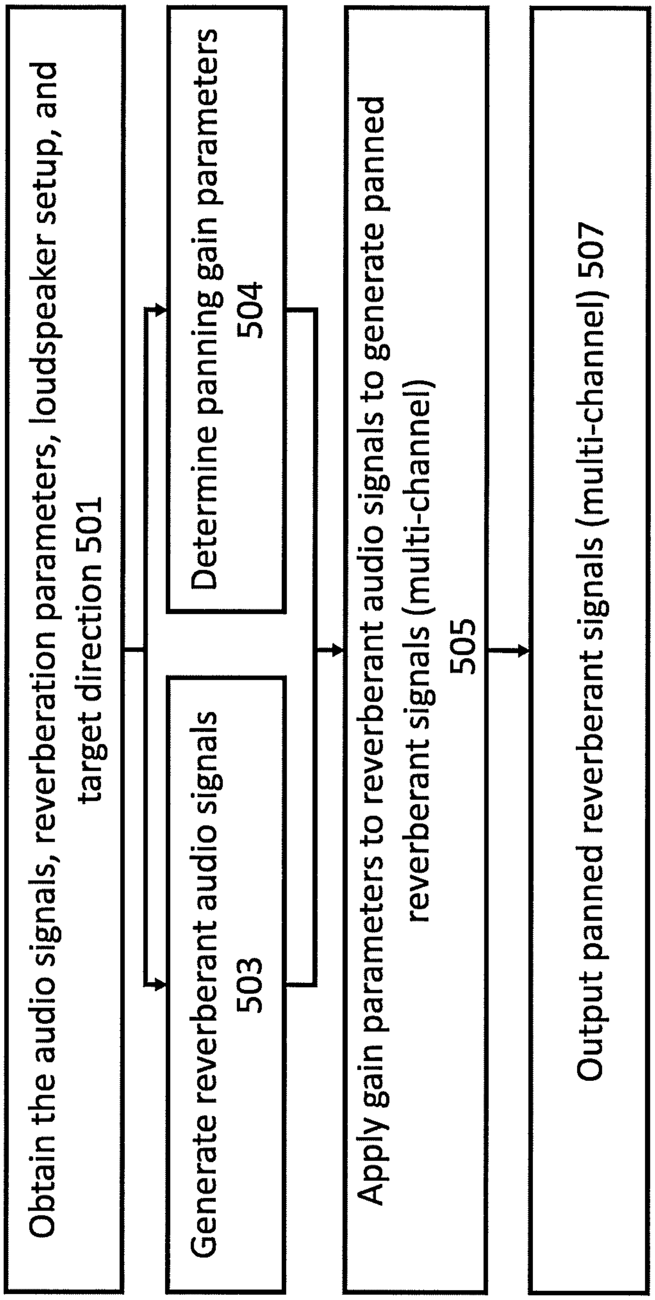
FIG. 5 shows a flow diagram of the operation of the example reverberation panner as shown in FIG. 4.

With respect to FIG. 5 is shown a flow diagram of the operations of the panner shown in FIG. 4 according to some embodiments.

For example the method can comprise obtaining the audio signals, reverberation parameters, loudspeaker setup, and target direction as shown in FIG. 5 by step 501.

Then the reverberant audio signals are generated based on the application of the reverberation parameters to the audio signals as shown in FIG. 5 by step 503.

The panning gain parameters can furthermore be determined based on the loudspeaker setup and the target directions as shown in FIG. 5 by step 504.

The gain parameters can then be applied to the reverberant audio signals to generate panned reverberant signals as shown in FIG. 5 by step 505.

The reverberant audio signals can then be output as shown in FIG. 5 by step 507.

Figure 6A:
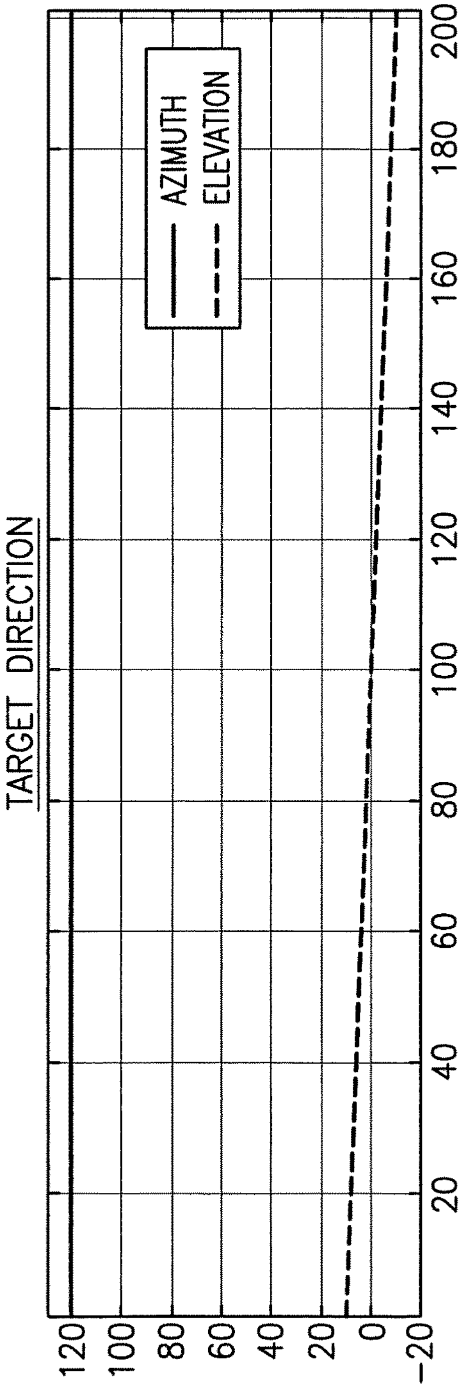
FIGS. 6A-6C (collectively referred to as FIG. 6) show example graphs of Target direction, panning gains, and reverberant channel mapping with an example target direction path and the effect of implementing some embodiments.
Figure 6B:
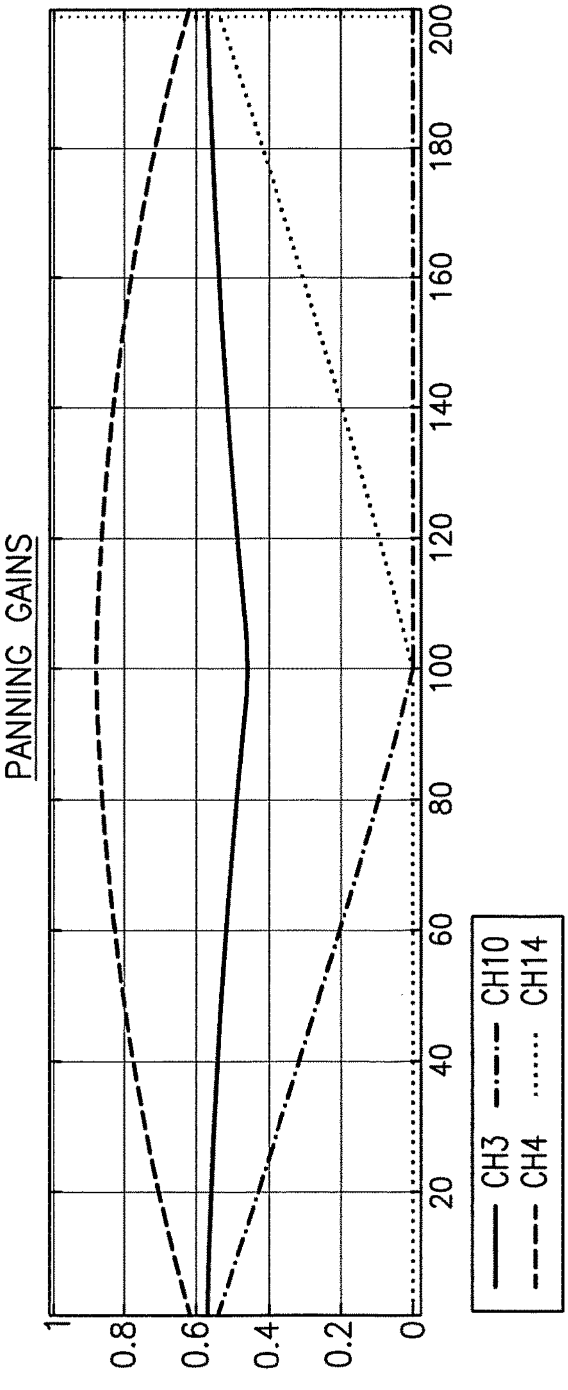
Figure 6C:
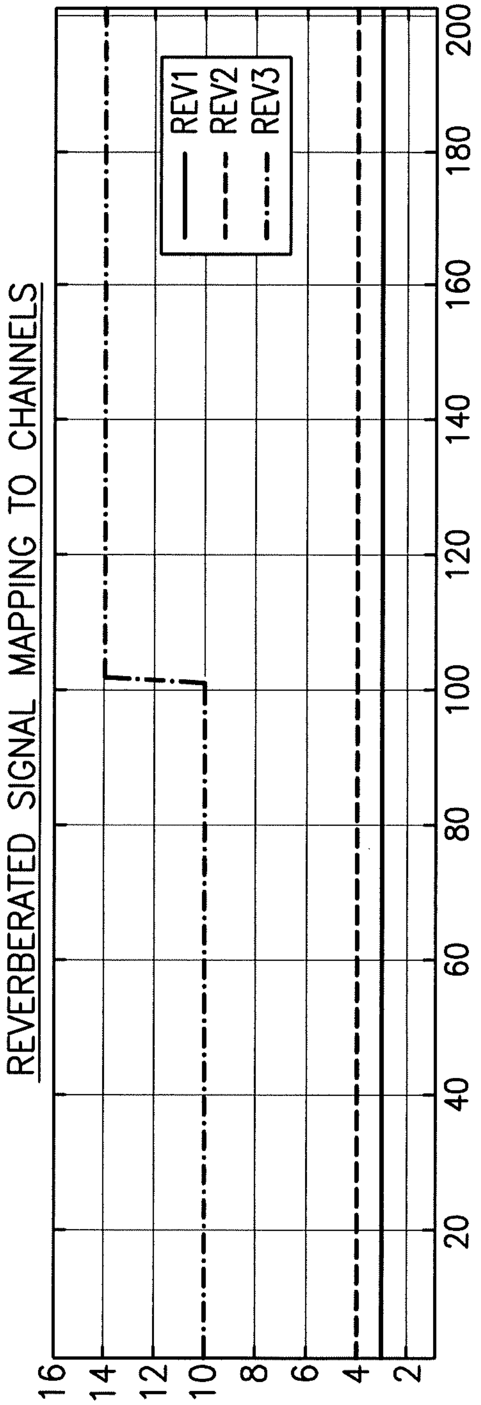

FIG. 6 shows an example graph showing the implementation of some embodiments where the Target direction is smoothly changed from $\theta_{target}$=0, $\phi_{target}$=10 to $\theta_{target}$=0, $\phi_{target}$=−10. The corresponding panning gains also change smoothly, and the panning gain for the channel 10 goes smoothly to zero, while the panning gain for the channel 14 smoothly increases from zero (after the gain of channel 10 has gone to zero). Thus, at the time instant when g(10) goes to zero, the channel mapping can be performed without any extra processing without causing any discontinuities. In case of other panning tools (or in case of abrupt changes in the "Target direction"), smoothing over time can be performed in order to slowly fade out the old panning gain to zero, and only after that changing the channel mapping and then fading in the new panning gain (e.g., using about 10-ms long Hann window shaped slopes, first Hann window half for fade in, second half for fade out).

Figure 7:
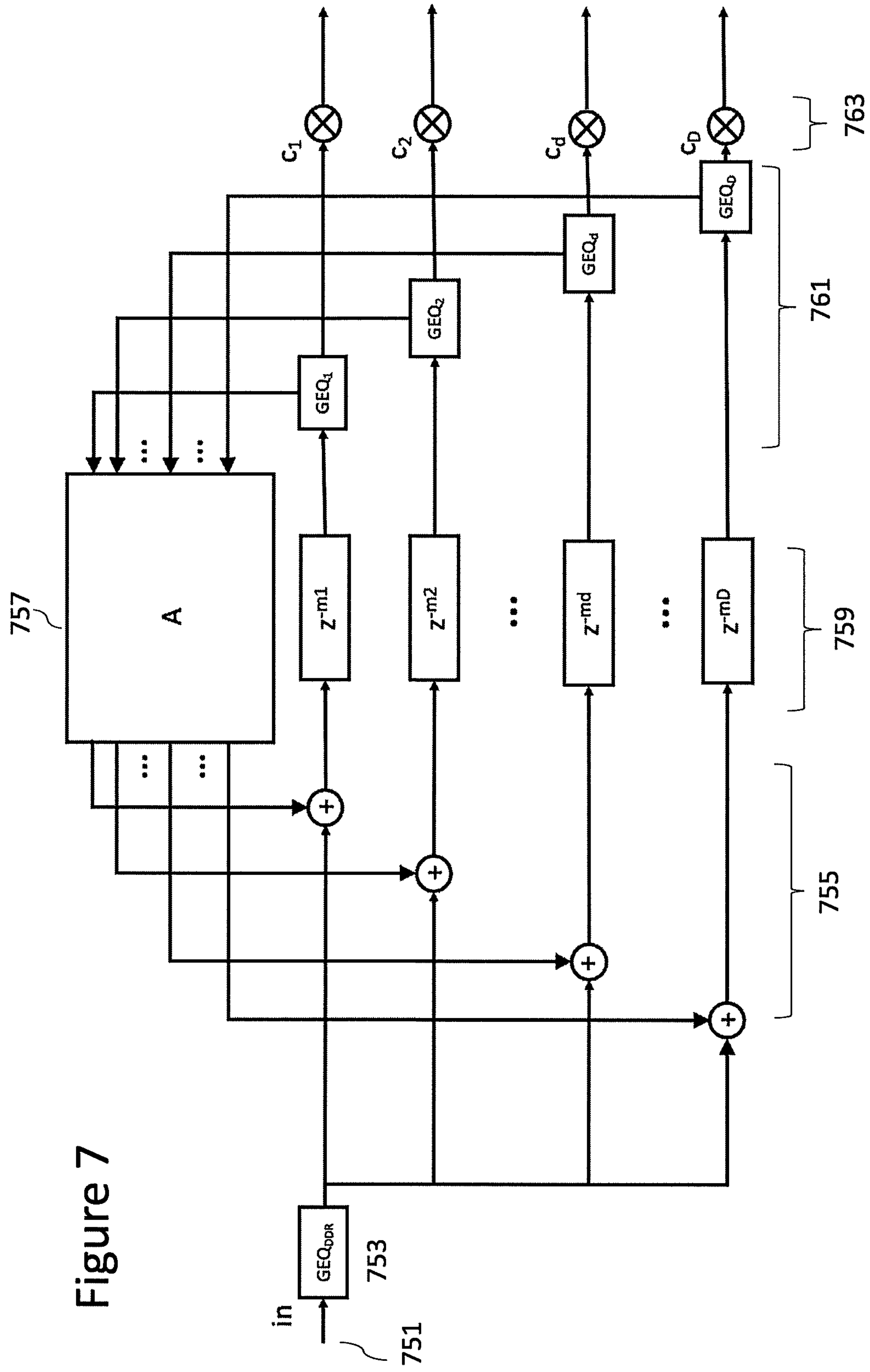
FIG. 7 shows schematically an example feedback-delay-network (FDN) reverberator according to some embodiments.

With respect to FIG. 7 is shown an example FDN reverberator, such as can be employed as the reverberator 401 and which can be used to produce D uncorrelated outputs. In the example shown in FIG. 4 there are three such FDN reverberators 401 each of which is configured to produce 15 uncorrelated outputs (D=15) for a total of 45 outputs. Thus, in this example implementation, there are 15 reverberation panner paths j.

The example FDN-reverberator implementation is configured such that the reverberation parameters are processed to generate coefficients $GEQ_d$ ($GEQ_1$, $GEQ_2$, . . . $GEQ_D$) of each attenuation filter 761, feedback matrix 757 coefficients A, lengths $m_d$ ($m_1$, $m_2$, . . . $m_D$) for D delay lines 759 and direct-to-reverberant ratio filter 753 coefficients $GEQ_{DDR}$.

In some embodiments each attenuation filter $GEQ_d$ is implemented as a graphic EQ filter using M biquad IIR band filters. With octave bands M=10, thus, the parameters of each graphic EQ comprise the feedforward and feedback coefficients for 10 biquad IIR filters, the gains for biquad band filters, and the overall gain. In some embodiments any suitable manner may be implemented to determine the FDN reverberator parameters, for example the method described in patent application GB patent application GB2101657.1 can be implemented for deriving FDN reverberator parameters such that the desired RT60 time for the virtual/physical scene can be reproduced.

The reverberator uses a network of delays 759, feedback elements (shown as gains 761, 757 combiners 755 and output gain 763) to generate a very dense impulse response for the late part. Input samples 751 are input to the reverberator to produce the reverberation audio signal component which can then be output.

The FDN reverberator comprises multiple recirculating delay lines. The unitary matrix A 757 is used to control the recirculation in the network. Attenuation filters 761 which may be implemented in some embodiments as graphic EQ filters implemented as cascades of second-order-section IIR filters can facilitate controlling the energy decay rate at different frequencies. The filters 761 are designed such that they attenuate the desired amount in decibels at each pulse pass through the delay line and such that the desired RT60 time is obtained. The example FDN reverberator shows a D-channel output, by providing the output from each FDN delay line as a separate output.

Figure 8:
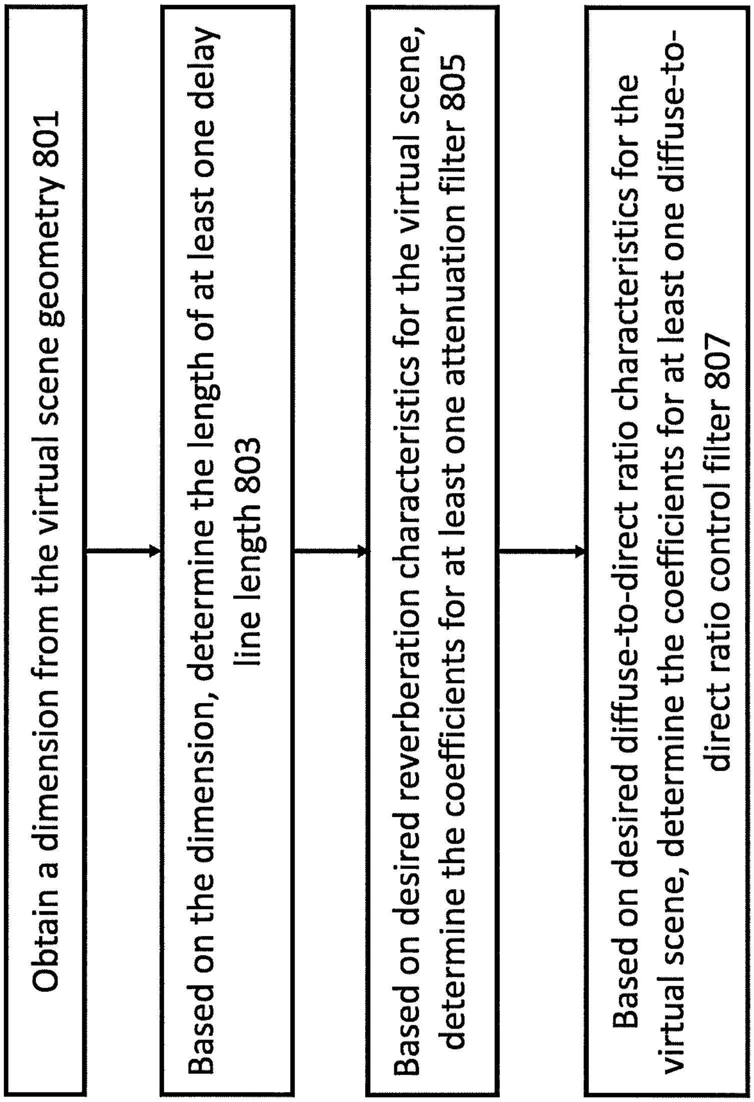
FIG. 8 shows a flow diagram of the operation of Adjusting the parameters of a feedback-delay-network (FDN) reverberator according to some embodiments.

FIG. 8 shows a flow diagram showing the adjusting of the parameters of a single FDN reverberator. For this reverberator the parameters contain the coefficients of each attenuation filter $GEQ_d$, feedback matrix coefficients A, and lengths and for D delay lines. In addition, diffuse-to-direct ratio filter $GEQ_{DDR}$ coefficients are included. In these embodiments, each attenuation filter $GEQ_d$ is a graphic EQ filter using M biquad IIR band filters. With octave bands M=10, thus, the parameters of each graphic EQ comprise the feedforward and feedback coefficients for 10 biquad IIR filters, the gains for biquad band filters, and the overall gain.

Thus the method comprises obtaining a dimension from the virtual scene geometry as shown in FIG. 8 by step 801.

The method may then further comprise determining the length of at least one delay line length based on the dimension as shown in FIG. 8 by step 803.

Then based on the desired reverberation characteristics for the virtual scene, determining the coefficients for at least one attenuation filter as shown in FIG. 8 by step 805.

Furthermore, based on the desired diffuse-to-direct ratio characteristics for the virtual scene the method is configured to determine the coefficients for at least one diffuse-to-direct ratio control filter as shown in FIG. 8 by step 807.

The number of delay lines D can be adjusted depending on quality requirements and the desired tradeoff between reverberation quality and computational complexity. In some embodiments, an efficient implementation with D=15 delay lines is used. This makes it possible to define the feedback matrix coefficients A as indicated in the method described in Rocchesso: Maximally Diffusive Yet Efficient Feedback Delay Networks for Artificial Reverberation, IEEE Signal Processing Letters, Vol. 4. No. 9, September 1997. Rocchesso in terms of a Galois sequence facilitating efficient implementation.

A length $m_d$ for the delay line d can be determined based on virtual room dimensions. The virtual room can be any suitable cuboid shape. Furthermore in acoustics these cuboids are called “shoebox shaped rooms”. For example, a shoebox shaped room can be defined with dimensions xDim, yDim, zDim. If the room is not shaped as a ‘shoebox’ then a ‘shoebox’ can be fit inside the room and the dimensions of the fitted shoebox can be utilized for the delay line lengths. Alternatively, the dimensions can be obtained as three longest dimensions in the non-shoebox shaped room, or other suitable method.

In some embodiments the delays are set proportionally to standing wave resonance frequencies in the virtual room or physical room. The delay line lengths md can further be made mutually prime.

In some embodiments the attenuation filter coefficients in the delay lines are adjusted so that a desired amount in decibels of attenuation happens at each signal recirculation through the delay line so that the desired RT60 time is obtained. This is implemented in a frequency specific manner to ensure the appropriate rate of decay of signal energy at specified frequencies.

The input to the encoder can, in some embodiments, provide the desired RT60 times per specified frequencies f denoted as RT60(f). For a frequency f, the desired attenuation per signal sample is calculated as attenuationPerSample(f)=−60/(samplingRate*rt60(f)). The attenuation in decibels for a delay line of length md is then attenuationDb(f)=$m_d$*attenuationPerSample(f).

In some embodiments, the RT60 time can be different for different spatial directions. In this case, the absorption filter for a delay line is adjusted based on the RT60 time of the target direction where this delay line is to be panned.

The attenuation filters in some embodiments are designed as cascade graphic equalizer filters as described in V. Välimäki and J. Liski, “Accurate cascade graphic equalizer,” IEEE Signal Process. Lett., vol. 24, no. 2, pp. 176-180, February 2017 for each delay line. The design procedure outlined takes as input a set of command gains at octave bands. There are also methods for a similar graphic EQ structure which can support third octave bands, increasing the number of biquad filters to 31 and providing better match for detailed target responses such as described in Third-Octave and Bark Graphic-Equalizer Design with Symmetric Band Filters, https://www.mdpi.com/2076-3417/10/4/1222/pdf.

Figure 9:
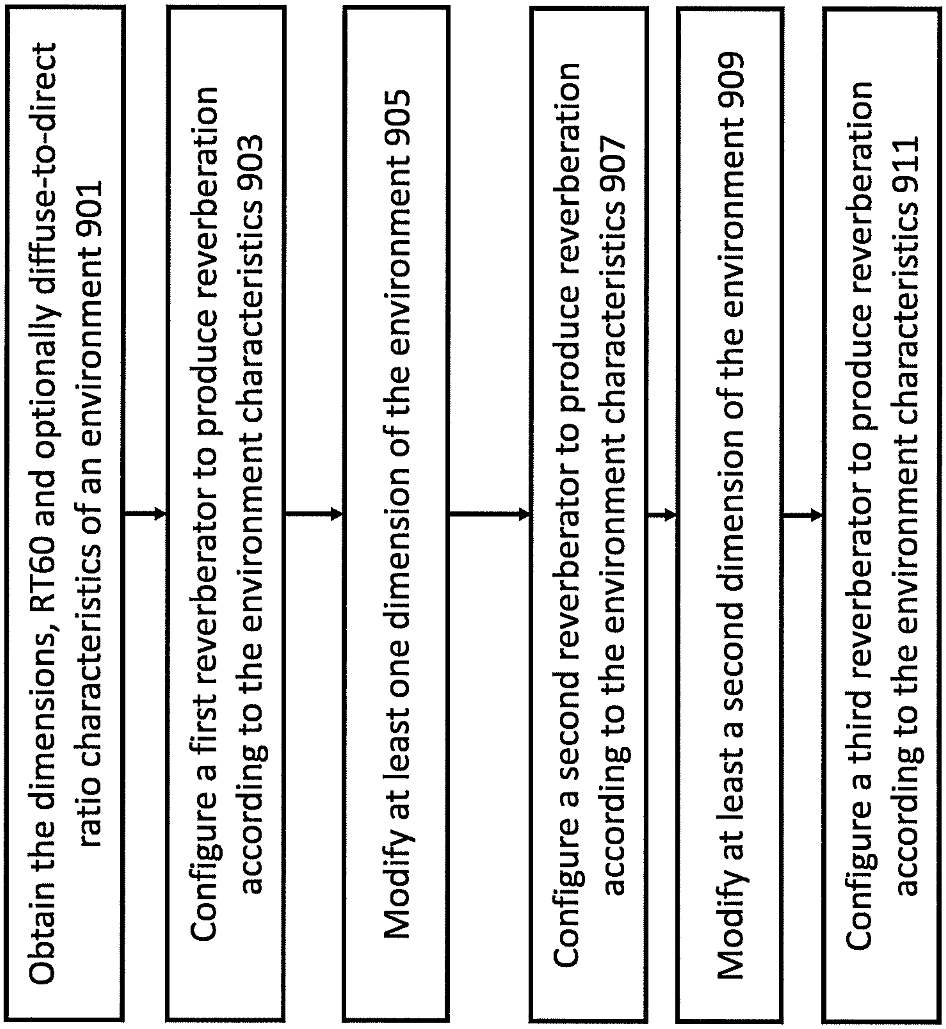
FIG. 9 shows a flow diagram of the operation of Adjusting the parameters of three feedback-delay-network (FDN) reverberators according to some embodiments.

With respect to FIG. 9 there is shown a flow diagram showing the method of adjusting the parameters of three FDN reverberators which produce uncorrelated outputs. In these embodiments it can comprise adjusting the parameters of one reverberator based on unmodified virtual room geometry and adjusting the parameters of the second and third FDN reverberator using modified virtual room geometries. For example, reverberator 1 is parameterized using the method shown in FIG. 8 using the virtual room dimensions xDim, yDim, zDim. The second FDN reverberator is tuned using modified virtual room dimensions 1.2*xDim, 1.2*yDim, 1.2*zDim. The third FDN reverberator is tuned using modified virtual room dimensions 0.8*xDim, 0.8*yDim, 0.8*zDim.

Thus for example the method can obtain the dimensions, RT60 and optionally diffuse-to-direct ratio characteristics of an environment as shown in FIG. 9 by step 901.

Then the method comprises configuring a first reverberator to produce reverberation according to the environment characteristics as shown in FIG. 9 by step 903.

Then at least one dimension of the environment is modified as shown in FIG. 9 by step 905.

Having modified the environment a second reverberator is configured to produce reverberation according to the modified environment characteristics as shown in FIG. 9 by step 907.

Then at least a second dimension of the environment is modified as shown in FIG. 9 by step 909.

Then a third reverberator is configured to produce reverberation according to the further modified environment characteristics as shown in FIG. 9 by step 911.

Since the FDN delay line lengths m1 through mD are adjusted based on scene geometry, modifying the scene geometry causes each of the reverberators to have different length delay lines which makes the outputs uncorrelated.

In some embodiments, all delay lines across all FDN reverberators are adjusted to have mutually prime lengths to ensure mutually uncorrelated outputs. This can be implemented, e.g., by having the first created FDN to report the delay line lengths it is using and creating the second FDN such that it does not use any of the delay line lengths the first FDN is using. The third FDN is created in such a manner that it does not use any of the delay line lengths used by the first or second FDN.

Figure 10:
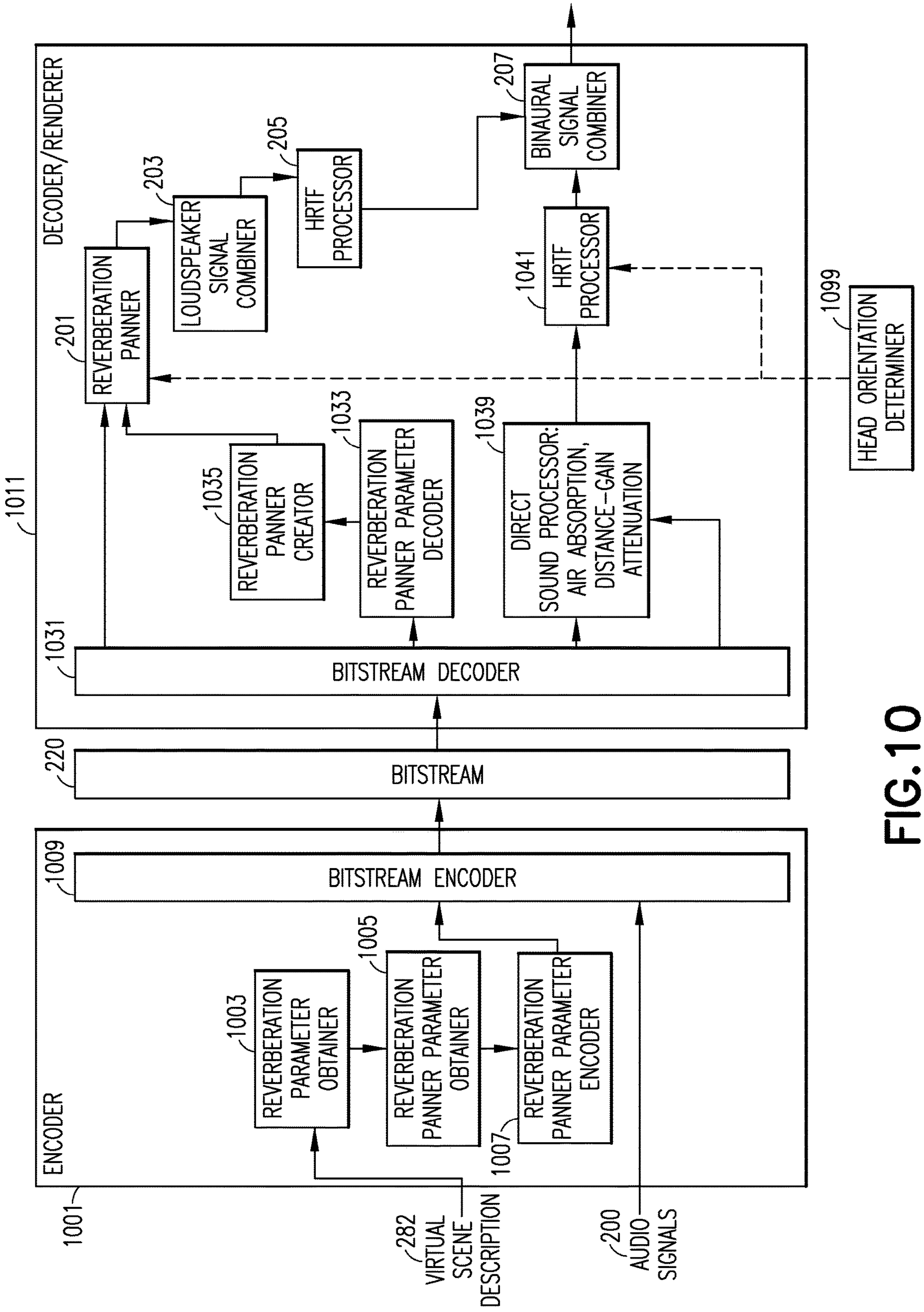
FIG. 10 shows the implementation of the apparatus as shown in FIG. 2 within an example application according to some embodiments.

FIG. 10 depicts an example implementation scenario according to some embodiments. The scenario corresponds to the envisioned use cases of the upcoming MPEG-I Audio Phase 2 standard which will support audio rendering in six-degrees-of-freedom (6DoF) scenarios for virtual reality (VR) and augmented reality (AR).

The input to the encoder is one or more audio signals 200 and a description of the virtual scene 282. The virtual scene description parameters 282 in some embodiments comprises a virtual scene geometry which may be defined as a triangle mesh format, the (mesh) acoustic material characteristics, the (mesh) reverberation characteristics, audio object positions (which can be defined in some embodiments as cartesian coordinates). In other words the virtual scene description 282 contains a description of acoustic environments which have desired reverberation parameters such as RT60 times, diffuse-to-total energy ratios, and scene geometry. These parameters are obtained by the encoder 1001.

The encoder 1001 comprises a reverberation parameter obtainer 1001 configured to derive the reverberation parameters which are passed to the reverberation panner parameter obtainer 105 and which is configured to determine the reverberation panner parameters (using the methods described above). The method derives reverberator parameters based on the scene geometry and reverberation characteristics. If reverberation characteristics are not provided they can be obtained via acoustic simulation using the virtual scene geometry and material characteristics. Geometric or wave-based virtual acoustic simulation methods or their combination can be used. For example, wave-based virtual acoustic simulation for lower frequencies and geometric acoustic methods for higher frequencies. The method described in GB patent application GB2101657.1 can be used for deriving reverberator parameters.

The parameters of the reverberation panners (the delay line lengths, the delay line attenuation filter coefficients, the diffuse-to-direct ratio filter coefficients, and the target directions) can then be passed to a reverberation panner parameter encoder 1007 which is configured to encode the parameters. The encoded reverberation panner parameters can then be passed to a bitstream encoder 1009 which then with the audio signal 200 is configured to generate a bitstream 220. In other words other contents of the virtual scene description can be also encoded into the bitstream. The audio signals are encoded with MPEG-H 3D audio and multiplexed into the bitstream.

The decoder/renderer 1011 is configured to receive the bitstream 220 description of the virtual scene contents, the rendering parameters such as reverberation panner parameters, and the audio signals.

In some embodiments the decoder/renderer 1011 comprises a bitstream decoder 1031. The bitstream decoder 1031 is configured to decode/separate and output from the bitstream the ‘encoded’ description of the virtual scene contents, the rendering parameters such as reverberation panner parameters, and the audio signals.

The decoder/renderer 1011 in some embodiments comprises a reverberation panner parameter decoder 1033 configured to obtain from the bitstream decoder 1031 obtains the encoded Reverberation panner parameters and creates the Reverberation panner parameters and output these to a reverberation panner creator 1035.

The decoder/renderer 1011 further comprises a reverberation panner creator 1035 configured to receive the decoded reverberation panner parameters and initialize the reverberation panner 201. In this example only one reverberation panner 201 is shown but as described above there can be employed multiple reverberation panners each with their own reverberation parameters and target directions.

The reverberation panner 201, the loudspeaker signal combiner 203 and HRTF processor 205 can then be implemented as described earlier based on the output of the head orientation determiner 1099 and the loudspeaker setup or configuration information from the bitstream decoder 1031. In other words the reverberation panner 201, the loudspeaker signal combiner 203 and HRTF processor 205 can be used to render audio signals with desired reverberation characteristics. It should be noted that in this example, the rotation of the target directions based on the head-tracking information is performed inside the reverberation panner 201, whereas it was performed outside the panner in the example embodiments described with respect to FIGS. 2 to 5.

Additionally the decoder/renderer 1011 comprises a direct sound processor 1039 which is configured to receive the decoded audio signals from the bitstream decoder 1031 and configured to implement any direct sound processing such as air absorption and distance-gain attenuation and which can be passed to a HRTF processor 1041 which with the head orientation determination generate the direct sound component which with the reverberant component from the HRTF processor 205 is passed to a binaural signal combiner 207. The binaural signal combiner 207 is configured to combine the direct and reverberant parts to generate a suitable output (for example for headphone reproduction).

Although not shown, there can be various other audio processing methods applied such as early reflection rendering combined with the proposed methods.

In some embodiments the reverberation panner parameters can be partially or completely derived by the renderer.

For example, such can be the case in AR audio rendering where the renderer receives a description of the listening space along with desired reverberation parameters.

The approaches as described in the above embodiments furthermore can be configured to aim to overcome the problem with reverberators and reverberation spatialization solutions in rendering in a computationally efficient manner reverberations from a large number of channels. A straightforward way to obtain high quality reverberation which really envelopes the user would be to tune a large reverberator with, for example, 45 output channels. However, if such a reverberator is implemented as an FDN reverberator then the feedback matrix calculation becomes computationally intensive as for each sample the feedback across 45 delay lines needs to be implemented with the feedback matrix.

In the embodiments described herein it is possible to employ three FDN reverberators each of which have only 15 channels, which can be run in parallel on modern processor architectures and which individually have fast feedback matrix operation without actually performing a matrix multiplication. Moreover a spatialization of 45 reverberator output channels would currently require 45 virtual loudspeakers and 45 HRTF filters whereas in the embodiments described herein it is only required to calculate the gains for 15 virtual loudspeakers and perform spatialization with 15 HRTF filters.

In some embodiments the apparatus and methods described herein can be employed without significant inventive input to produce also other incoherent content (other than reverberation). For example ambience sounds can be reproduced as surrounding and enveloping using the embodiments described above. In this example the reverberators can be replaced by decorrelators. Also the Reverberation parameters can be omitted in some embodiments. Instead, different microphone signals may be forwarded to the different reverberation panner paths j. For example, the microphones may be attached on a surface of a device that is acoustically shadowing. As a result, the different microphones may capture ambience (and/or reverberation) in a direction-dependent manner. Thus, in practice, this produces the same effect as providing direction-dependent Reverberation parameters.

Figure 11:
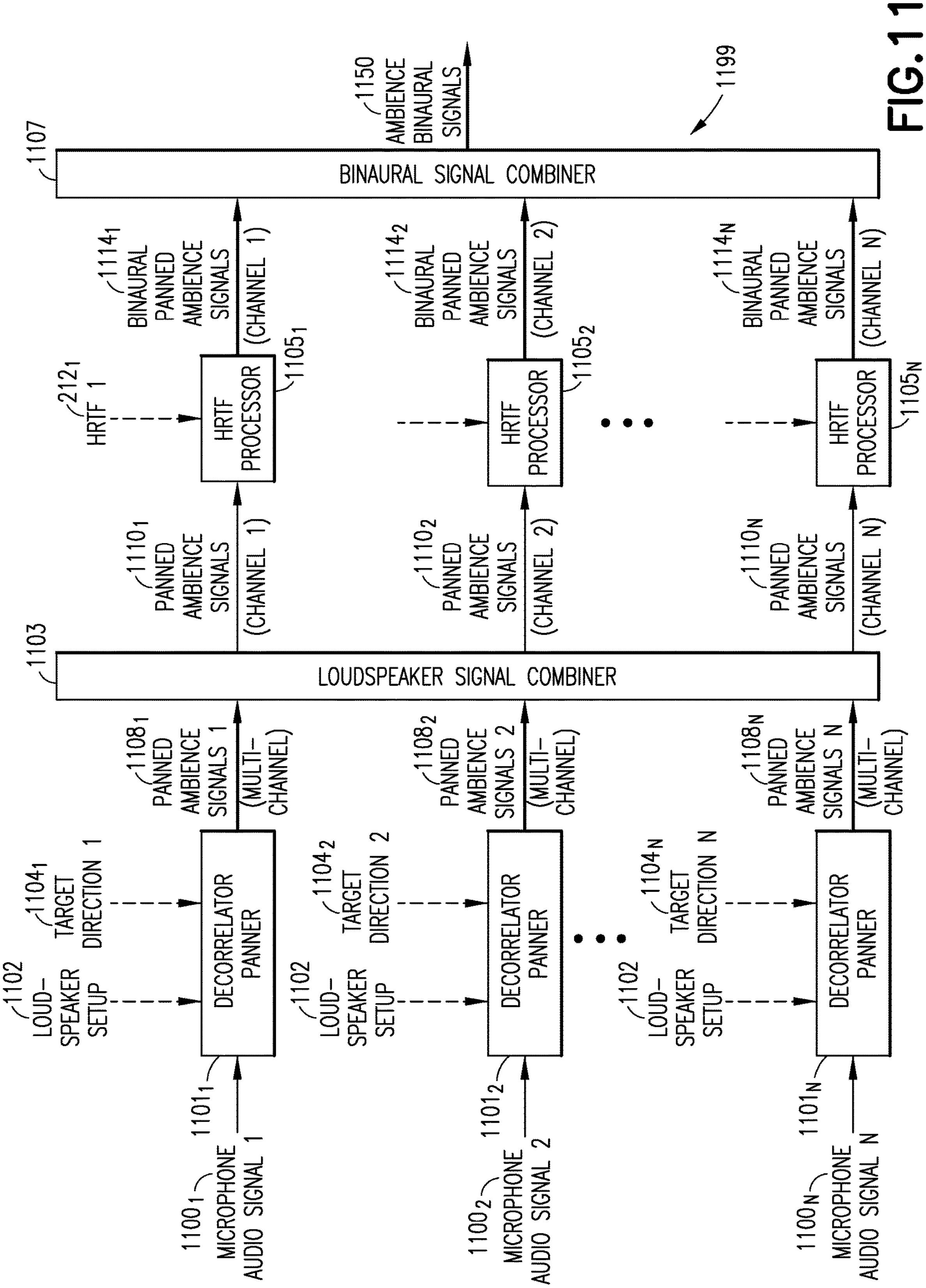
FIG. 11 shows schematically an example apparatus for microphone audio signals within which some embodiments can be implemented.
Figure 12:
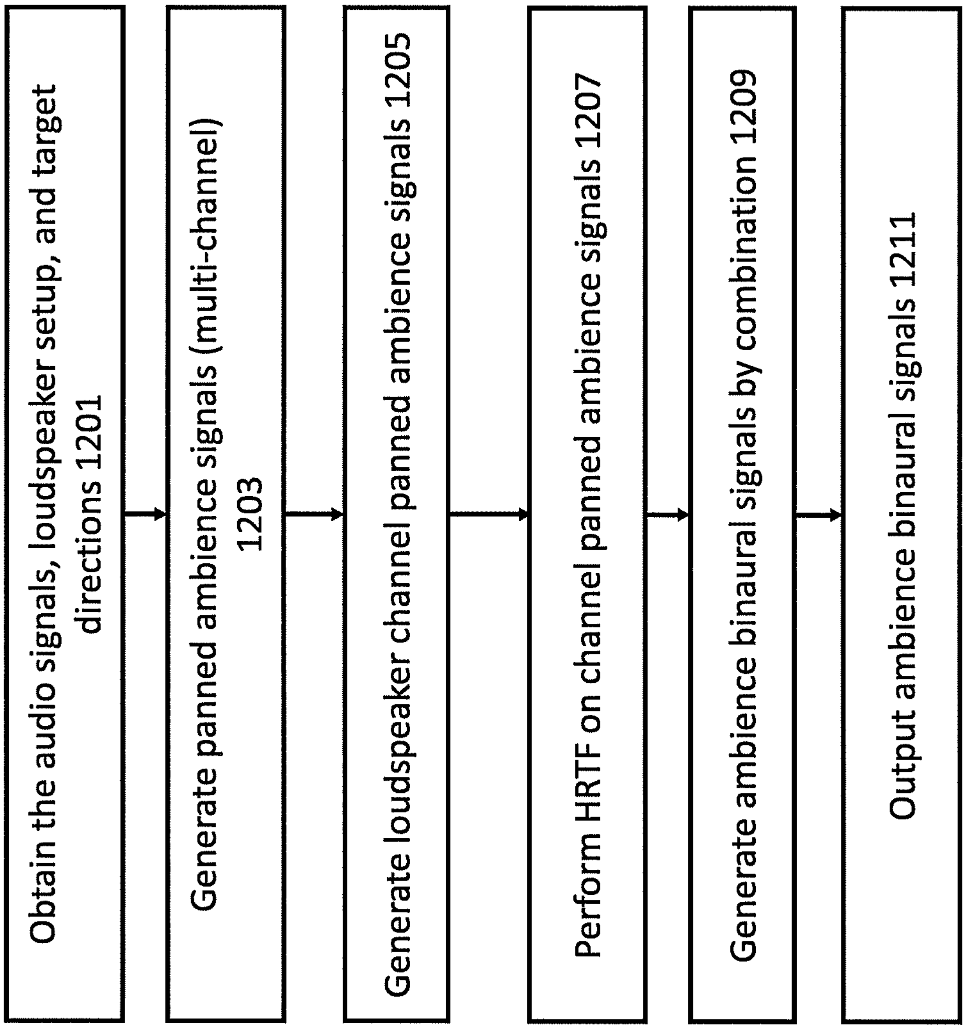
FIG. 12 shows a flow diagram of the operation of the example apparatus as shown in FIG. 11.

FIG. 11 show a schematic view of an example embodiment and FIG. 12 shows a flow diagram of the operation of the example embodiment. This is similar to the example shown in FIG. 2 and only the differences are presented in detail.

The input to the apparatus shown in FIG. 11 is multiple microphone signals 1100 (these are shown a microphone signal 1 $\mathbf{1100}_1$, microphone signal 2 $\mathbf{1100}_2$, microphone signal N $\mathbf{1100}_N$) instead of a single audio signal 200. These input microphone signals are forwarded to an associated Decorrelator panner 1101. Thus microphone signal 1 $\mathbf{1100}_1$ is forwarded to decorrelator panner $\mathbf{1101}_1$, microphone signal 2 $\mathbf{1100}_2$ is forwarded to decorrelator panner $\mathbf{1101}_2$, and microphone signal N $\mathbf{1100}_N$ is forwarded to decorrelator panner $\mathbf{1101}_N$.

Each decorrelator panner 1101 (replacing the reverberation panner shown in FIG. 2) is also configured to receive the loudspeaker setup 1102 and a target direction 1104 parameters but not any reverberation parameters. Thus for example as shown in FIG. 11 there is a first decorrelator panner $\mathbf{1101}_1$ configured to receive the loudspeaker setup 1102 and a first target direction (target direction 1) $\mathbf{1104}_1$ a second decorrelator panner $\mathbf{1101}_2$ configured to receive the loudspeaker setup 1102 and a second target direction (target direction 2) $\mathbf{1104}_2$ and a N'th decorrelation panner $\mathbf{1101}_N$ configured to receive the loudspeaker setup 1102 and a N'th target direction (target direction N) $\mathbf{1104}_N$.

The target direction 1104 in some embodiments may be derived from the head orientation and the respective directions of the microphones in the array. Each of the decorrelator panners $\mathbf{1101}_1$, $\mathbf{1101}_2$, $\mathbf{1101}_N$ in some embodiments is configured to operate in a manner similar to the reverberation panners $\mathbf{201}_1$, $\mathbf{201}_2$, $\mathbf{201}_N$ as described earlier, but rather than reverberating the input microphone signals is configured to decorrelate the microphone audio signals to generate panned ambience signals (multi-channel) 1108. For example a first panned ambience signals (panned ambience signals 1) $\mathbf{1108}_1$ from the first decorrelator panner $\mathbf{1101}_1$, a second panned ambience signals (panned ambience signals 2) $\mathbf{1108}_2$ from the second decorrelator panner $\mathbf{1101}_2$, and N'th panned ambience signals (panned ambience signals N) $\mathbf{1108}_N$ from the N'th decorrelator panner $\mathbf{1101}_N$, which can be passed to a loudspeaker signal combiner 1103.

The loudspeaker signal combiner 1103 is configured to combine the outputs of the decorrelator panners $\mathbf{1101}_1$, $\mathbf{1101}_2$, and $\mathbf{1101}_N$ in the form of panned ambience signals $\mathbf{1108}_1$ $\mathbf{1108}_2$ and $\mathbf{1108}_N$ respectively and furthermore generate and pass panned ambience signals 1110 (shown in FIG. 11 as $\mathbf{1110}_1$, $\mathbf{1110}_1$, and $\mathbf{1110}_N$) for selected channels from 1 to N to HRTF processors 1105.

The HRTF processors are configured to obtain the HRTF 212 for each HRTF processor 1105 and configured to generate from the processed panned ambience signals the binaural panned ambience signals 1114, which are passed to the binaural signal combiner 1107.

The binaural signal combined 1107 receives the binaural panned ambience signals 1114 and based on these generates ambience binaural signals 1150. The resulting ambience binaural signals 1150 produce a perception of surrounding, enveloping ambience. Moreover, the directional characteristics of the ambience are produced to the correct directions since the directional characteristics of the different microphones are maintained and reproduced from the correct directions.

With respect to FIG. 12 is shown a flow diagram showing the example operations of the apparatus 1199 of FIG. 11.

Thus the method comprises obtaining the microphone audio signals, loudspeaker setup, and target directions, as shown in FIG. 12 by step 1201.

Then having obtained the microphone audio signals, loudspeaker setup, and target direction then generate panned ambience signals (multi-channel) as shown in FIG. 12 by step 1203.

The panned ambience signals can then be combined to generate loudspeaker channel panned ambience signals as shown in FIG. 12 by step 1205.

Then HRTF processing is performed on channel panned ambience signals as shown in FIG. 12 by step 1207.

The processed signals can then be combined to generate ambience binaural signals as shown in FIG. 12 by step 1209.

The ambience binaural signals can then be output as shown in FIG. 12 by step 1211.

Figure 13:
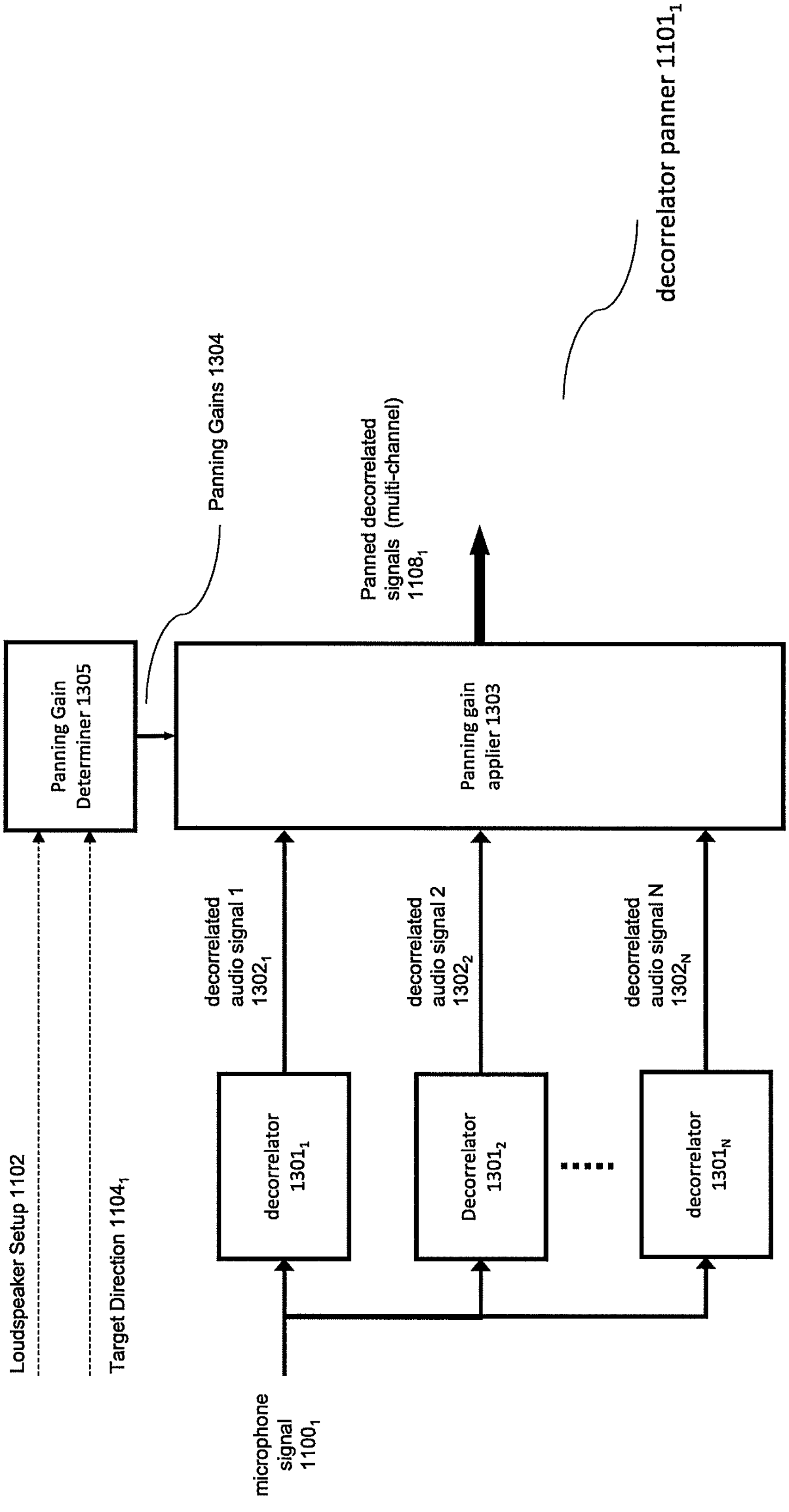
FIG. 13 shows schematically an example decorrelator panner as shown in FIG. 12 according to some embodiments.

FIG. 13 shows schematically an example decorrelator panner (for example decorrelator panner $\mathbf{1101}_1$) as shown in FIG. 11. It is configured to operate otherwise similar to the reverberation panner shown in FIG. 4, but where the reverberator 401 replaced by decorrelator 1301, that are configured to produce mutually incoherent decorrelated signals. In these embodiments there is no reverberation parameters input but rather a decorrelated audio signal 1302 is output from each of the decorrelators which is passed to the panning gain applier 1303. Thus FIG. 13 shows a first decorrelator $\mathbf{1301}_1$ receiving the microphone signal $\mathbf{1100}_1$ and outputting a first decorrelated audio signal (decorrelated audio signal 1) $\mathbf{1302}_1$, a second decorrelator $\mathbf{1301}_2$ receiving the microphone signal $\mathbf{1100}_1$ and outputting a second decorrelated audio signal (decorrelated audio signal 2) $\mathbf{1302}_2$, and a N'th decorrelator $\mathbf{1301}_N$ receiving the microphone signal $\mathbf{1100}_1$ and outputting a N'th decorrelated audio signal (decorrelated audio signal N) $\mathbf{1302}_N$.

Additionally is shown the panning gain determiner 1305 configured to receive the loudspeaker setup 1102 and target direction $\mathbf{1104}_4$ and generate the panning gains 1304 which are passed to the panning gain applier 1303.

The panning gain applier 1303 is configured to receive the outputs from the decorrelators $\mathbf{1301}_1$, $\mathbf{1301}_2$, and $\mathbf{1301}_N$, and apply the panning gains and combine these to generate the panned decorrelated signals $\mathbf{1108}_1$.

Figure 14:
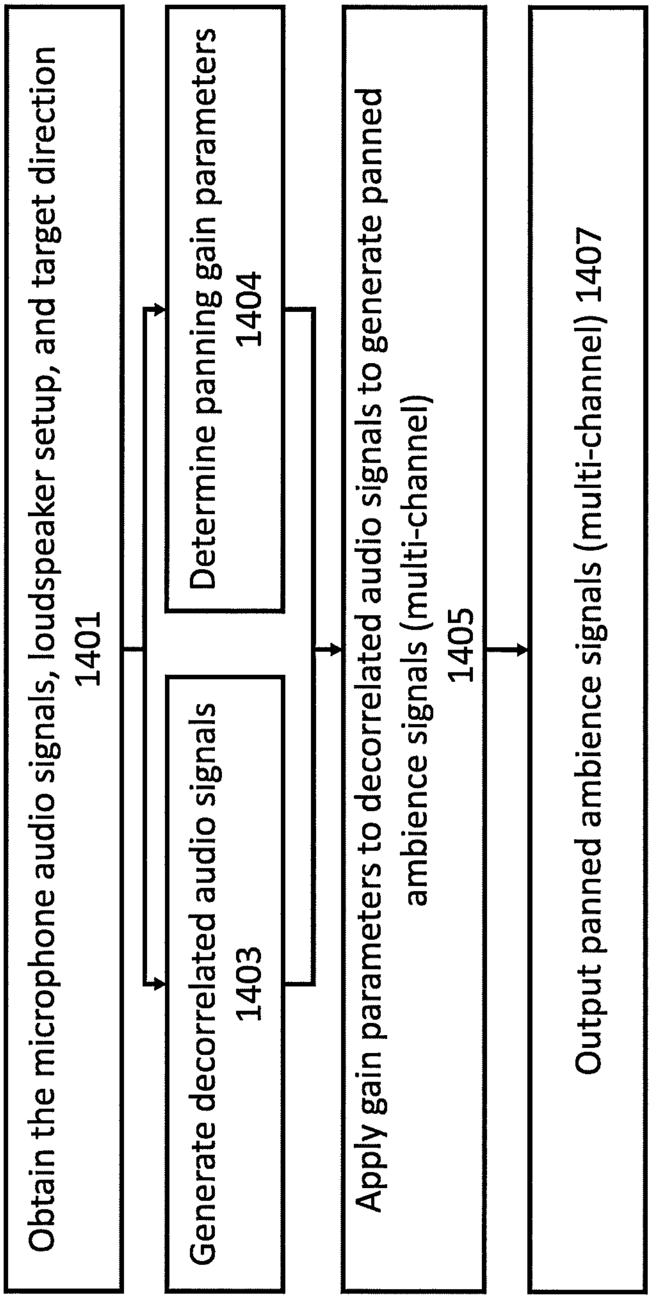
FIG. 14 shows a flow diagram of the operation of the example decorrelator panner as shown in FIG. 13.

With respect to FIG. 14 is shown a flow diagram of the operations of the panner shown in FIG. 13 according to some embodiments.

For example the method can comprise obtaining the microphone audio signals, loudspeaker setup, and target direction as shown in FIG. 14 by step 1401.

Then the decorrelated audio signals are generated from the microphone audio signal 1100 as shown in FIG. 14 by step 1403.

The panning gain parameters can furthermore be determined based on the loudspeaker setup and the target directions as shown in FIG. 14 by step 1404.

The gain parameters can then be applied to the decorrelated audio signals to generate panned ambience signals as shown in FIG. 14 by step 1405.

The ambience audio signals can then be output as shown in FIG. 14 by step 1407.

It is noted that although in the example described herein there are shown several reverberation panners or reverberators, they can be implemented inside a single reverberation panner or reverberator. For example, a FDN reverberator feedback matrix can be configured to have a block structure where the blocks correspond to the desired feedback matrix of a smaller FDN instance. Then the actual implementation can be a single FDN which jointly implements the smaller FDNs using the block feedback matrix and appropriate delay lines.

Furthermore in some embodiments the delay line lengths of an FDN reverberator can be set in different ways than that described herein. For example one further alternative is to make the delay lengths proportional to the mean free path length in a virtual room. In some embodiments the virtual room dimensions are mapped into the dimensions of another room. For example one of the rooms can have dimensions with ratios [1, 1.6, 2.56]. In these embodiments, the shortest dimension of the input virtual room is used as is corresponding to the ratio 1, and the other two dimensions are calculated based on the ratios 1.6 and 2.56 times the shortest input room dimension. Then the delay line lengths are adjusted based on these calculated dimensions of another room.

In some embodiments, there may also be other dimension ratios. For example, the following dimension ratios may be used

[1 1 1]
[1 1.14 1.39]
[1 1.26 1.59]
[1 1.28 1.54]
[1 1.3 1.9]
[1 1.4 1.9]
[1 1.5 2.5]
[1 1.6 2.33], from which one dimension ratio set may be selected.

Moreover, in some embodiments, the different dimension ratios may be stored in the renderer, and an index which one to use may be sent from the encoder to the renderer.

The delay line attenuation filters of the FDN reverberator can furthermore in some embodiments have different implementations, such as parallel second order section filters, any other combinations of IIR filters, or FIR filters.

The reverberator can be implemented in any suitable manner. For example in some embodiments the reverberator can be implemented using convolution with decaying noise sequences. In this approach, a multichannel reverberator can be created by initializing N uncorrelated bandpassed noise sequences which are multiplied with a desired decay envelope based on the desired RT60 time for each band. Output signals can then be created by convolving the input signal with each of the bandpassed noise sequences. As such reverberators do not depend on the virtual scene geometry, three reverberators can be initialized by using different uncorrelated noise sequences in all bands of all the reverberators.

In the example embodiment above, the target direction $\theta_{target}(j,n)$, $\phi_{target}(j,n)$ and all the subsequent processing was performed with the temporal accuracy of the audio sample. In some embodiments, the target direction and/or any other variables (such as the panning gains) can be determined with any other temporal resolution (e.g., every 10 ms), and the needed variables may then be suitably interpolated.

In the example embodiments, VBAP was used for panning gain determination. VBAP produces at most three non-zero gains, so at most three reverberators are needed in each reverberation panner. In some embodiments, a different method for panning gain determination may be used. Thus, in some embodiments the number of reverberators can be any suitable number accordingly. For example if the panning tool produces four non-zero gains, four reverberators can be employed per panner).

In some embodiments, there can be a split between encoder/renderer in adjusting the reverberator parameters so that the parameters of a first reverberator are adjusted in the encoder and encoded into the bitstream. In the renderer, the parameters of the first reverberator are decoded, and then modified to create the second and third reverberator. An example of such a modification includes modifying the delay line lengths mD and attenuation filter coefficients $GEQ_d$ of a first reverberator to obtain parameters for the second and third reverberator. The delay line lengths can be modified to be shorter or longer and the attenuation filter coefficients can be modified accordingly to produce the desired RT60 times. Then, a first reverberator is initialized using the parameters derived by the encoder and received from the bitstream, and a second and third reverberator are initialized by using the parameters modified from the ones of the first reverberator.

In some embodiments, the bitstream from an encoder to a renderer may contain signaling whether to apply head tracking or not (for example, employing a 'headTrackingEnabled' signal). In this example where headTrackingEnabled is true (or any other suitable signaling indicating that head tracking is to be applied), the reverberation can be rendered using the methods presented herein. In the example where headTrackingEnabled is false (or any other suitable signaling indicating that head tracking in not to be used), the reverberation can be rendered without the use of panning simply by using a single reverberator for each channel of the multichannel setup. This headTrackingEnabled may be signaled for the whole scene using a single value, or it may be separately signaled for different parts of the scene (for example, having individual values for different acoustic environments). Moreover, this information may also be signaled indirectly in some embodiments (for example, in case of having parameters to initialize the three reverberators of each reverberation panner, the head tracking is enabled; and in case those are not available, the head tracking is disabled).

Figure 15:
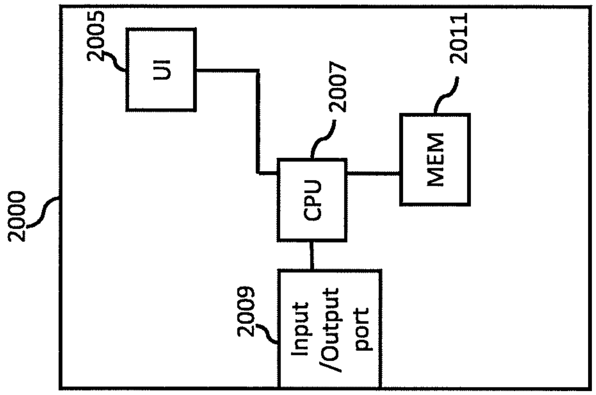
FIG. 15 shows an example device suitable for implementing the apparatus shown in previous figures.

With respect to FIG. 15 an example electronic device which may be used as any of the apparatus parts of the system as described above. The device may be any suitable electronics device or apparatus. For example in some embodiments the device 2000 is a mobile device, user equipment, tablet computer, computer, audio playback apparatus, etc. The device may for example be configured to implement the encoder or the renderer or any functional block as described above.

In some embodiments the device 2000 comprises at least one processor or central processing unit 2007. The processor 2007 can be configured to execute various program codes such as the methods such as described herein.

In some embodiments the device 2000 comprises a memory 2011. In some embodiments the at least one processor 2007 is coupled to the memory 2011. The memory 2011 can be any suitable storage means. In some embodiments the memory 2011 comprises a program code section for storing program codes implementable upon the processor 2007. Furthermore in some embodiments the memory 2011 can further comprise a stored data section for storing data, for example data that has been processed or to be processed in accordance with the embodiments as described herein. The implemented program code stored within the program code section and the data stored within the stored data section can be retrieved by the processor 2007 whenever needed via the memory-processor coupling.

In some embodiments the device 2000 comprises a user interface 2005. The user interface 2005 can be coupled in some embodiments to the processor 2007. In some embodiments the processor 2007 can control the operation of the user interface 2005 and receive inputs from the user interface 2005. In some embodiments the user interface 2005 can enable a user to input commands to the device 2000, for example via a keypad. In some embodiments the user interface 2005 can enable the user to obtain information from the device 2000. For example the user interface 2005 may comprise a display configured to display information from the device 2000 to the user. The user interface 2005 can in some embodiments comprise a touch screen or touch interface capable of both enabling information to be entered to the device 2000 and further displaying information to the user of the device 2000. In some embodiments the user interface 2005 may be the user interface for communicating.

In some embodiments the device 2000 comprises an input/output port 2009. The input/output port 2009 in some embodiments comprises a transceiver. The transceiver in such embodiments can be coupled to the processor 2007 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The input/output port 2009 may be configured to receive the signals.

In some embodiments the device 2000 may be employed as at least part of the renderer. The input/output port 2009 may be coupled to headphones (which may be a headtracked or a non-tracked headphones) or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus for positioning at least part of a sound field based on a target direction, the apparatus comprising:
- at least one processor; and
- at least one memory storing instructions that, when executed with the at least one processor, cause the apparatus to:
  - obtain at least one audio signal;
  - obtain speaker setup information;
  - obtain, for at least two processing paths, at least one processing path parameter, the at least one processing path parameter comprising the target direction;
  - process, for each of the at least two processing paths, the at least one audio signal to generate a panning-gain-applied multiple-channel audio signal, wherein for each processing path the instructions, when executed with the at least one processor, cause the apparatus to:
    - generate at least two at least partly mutually incoherent audio signals from the at least one audio signal;
    - determine at least two panning gains based on the target direction and the speaker setup information;
    - apply each of the at least two panning gains with an associated one of the at least partly mutually incoherent audio signals;
    - generate at least two panning gain applied at least partly mutually incoherent audio signals based on the applied at least two panning gains; and
    - generate the panning-gain-applied multiple-channel audio signal based on combining the at least two panning gain applied at least partly mutually incoherent audio signals from each processing path.

2. The apparatus as claimed in claim 1, wherein the at least one processing path parameter further comprises at least one reverberation parameter, wherein the instructions, when executed with the at least one processor, cause the apparatus to generate at least two at least partly mutually incoherent audio signals from the at least one audio signal is configured to reverberate, based on the at least one reverberation parameter, the at least one audio signal to generate each of the at least two at least partly mutually incoherent audio signals.

3. The apparatus as claimed in claim 1, wherein the instructions, when executed with the at least one processor, cause the apparatus to:
- decorrelate the at least one audio signal to generate each of the at least two at least partly mutually incoherent audio signals.

4. The apparatus as claimed in claim 1, wherein the instructions, when executed with the at least one processor, cause the apparatus to apply vector-base amplitude panning based on the target direction and directions associated with the speaker setup information.

5. The apparatus as claimed in claim 1, wherein the instructions, when executed with the at least one processor, cause the apparatus to generate an immersive audio signal based on processing the panning gain applied multiple-channel audio signal.

6. The apparatus as claimed in claim 5, wherein the instructions, when executed with the at least one processor, cause the apparatus to:
- process, for each channel of the combined panning gain applied multiple-channel audio signal, the panning gain applied multiple-channel audio signal based on a head related transfer function associated with a direction for a loudspeaker associated with the channel to generate a channel binaural panning processed audio signal; and
- combine, for all channels, the channel binaural panning processed audio signal to generate the immersive audio signal.

7. The apparatus as claimed in claim 1 wherein the instructions, when executed with the at least one processor, cause the apparatus to one of:
- receive speaker setup information;
- determine speaker setup information; or
- obtain predetermined or default speaker setup information.

8. The apparatus as claimed in claim 1, wherein the at least two at least partly mutually incoherent audio signals are mutually incoherent audio signals.

9. A method for an apparatus for positioning at least part of a sound field based on a target direction, the method comprising:
- obtaining at least one audio signal;
- obtaining speaker setup information;
- obtaining, for at least two processing paths, at least one processing path parameter, the at least one processing path parameter comprising the target direction;
- processing, for each of the at least two processing paths, the at least one audio signal to generate a panning-gain-applied multiple-channel audio signal, wherein the processing comprises:
  - generating at least two at least partly mutually incoherent audio signals from the at least one audio signal;
  - determining at least two panning gains based on the target direction and the speaker setup information;
  - applying each of the at least two panning gains with an associated one of the at least partly mutually incoherent audio signals;
  - generating at least two panning gain applied at least partly mutually incoherent audio signals based on the applied at least two panning gains; and
  - generating the panning-gain-applied multiple-channel audio signal based on combining the at least two panning gain applied at least partly mutually incoherent audio signals from each processing path.

10. The method as claimed in claim 9, wherein the at least one processing path parameter further comprises at least one reverberation parameter, wherein generating at least two at least partly mutually incoherent audio signals from the at least one audio signal comprises reverberating, based on the at least one reverberation parameter, the at least one audio signal to generate each of the at least two at least partly mutually incoherent audio signals.

11. The method as claimed in claim 10, wherein generating at least two at least partly mutually incoherent audio signals from the at least one audio signal comprises decorrelating the at least one audio signal to generate each of the at least two at least partly mutually incoherent audio signals.

12. The method as claimed in claim 9, wherein determining at least two panning gains based on the target direction and the speaker setup information comprises applying vector-base amplitude panning based on the target direction and directions associated with the speaker setup information.

13. The method as claimed in claim 9, wherein the method comprises generating an immersive audio signal based on processing the panning gain applied multiple-channel audio signal.

14. The method as claimed in claim 13, wherein generating the immersive audio signal based on processing the panning gain applied multiple-channel audio signal comprises:

processing, for each channel of the combined panning gain applied multiple-channel audio signal, the panning gain applied multiple-channel audio signal based on a head related transfer function associated with a direction for a loudspeaker associated with the channel to generate a channel binaural panning processed audio signal; and combining, for all channels, the channel binaural panning processed audio signal to generate the immersive audio signal.

15. The method as claimed in claim 9, wherein obtaining speaker setup information comprises one of:

receiving speaker setup information;

determining speaker setup information; or obtaining predetermined or default speaker setup information.

16. The method as claimed in claim 9, wherein the at least two at least partly mutually incoherent audio signals are mutually incoherent audio signals.

17. The apparatus as claimed in claim 1, wherein the obtained at least one audio signal is at least one microphone audio signal.

18. The apparatus as claimed in claim 1, wherein the speaker setup information represents a loudspeaker setup.

19. The method as claimed in claim 11, wherein the at least one audio signal is at least one microphone audio signal.

20. The method as claimed in claim 11, wherein the speaker setup information represents a loudspeaker setup.

21. A non-transitory program storage device readable by an apparatus, tangibly embodying a program of instructions executable with the apparatus for performing the method as claimed in claim 9.

22. An apparatus for positioning at least part of a sound field, the apparatus comprising:

at least one processor; and at least one memory storing instructions that, when executed with the at least one processor, cause the apparatus to:

generate at least two at least partly mutually incoherent audio signals from at least one audio signal;

determine at least two panning gains based on a target direction associated with a processing path and speaker setup information;

apply each of the at least two panning gains with an associated one of the at least partly mutually incoherent audio signals;

generate at least two panning gain applied at least partly mutually incoherent audio signals based on the applied at least two panning gains; and generate a panning-gain-applied multiple-channel audio signal based on the at least two panning gain applied at least partly mutually incoherent audio signals.

* * * * *